United States Patent
Yamada et al.

(10) Patent No.: US 8,250,410 B2
(45) Date of Patent: Aug. 21, 2012

(54) VIDEO RECORDING AND REPRODUCING APPARATUS AND METHOD THEREOF

(75) Inventors: Masahiro Yamada, Osaka (JP); Hideaki Mita, Hyogo (JP); Takanori Okada, Osaka (JP)

(73) Assignee: Panasonic Corporation, Osaka (JP)

( * ) Notice: Subject to any disclaimer, the term of this patent is extended or adjusted under 35 U.S.C. 154(b) by 229 days.

(21) Appl. No.: 12/667,570

(22) PCT Filed: Jul. 2, 2008

(86) PCT No.: PCT/JP2008/001745
§ 371 (c)(1),
(2), (4) Date: Jan. 4, 2010

(87) PCT Pub. No.: WO2009/004806
PCT Pub. Date: Jan. 8, 2009

(65) Prior Publication Data
US 2010/0185900 A1    Jul. 22, 2010

(30) Foreign Application Priority Data
Jul. 4, 2007  (JP) ................................. 2007-176596

(51) Int. Cl.
G06F 11/00  (2006.01)
(52) U.S. Cl. ........................... 714/42; 386/201; 386/243
(58) Field of Classification Search ..................... 714/42
See application file for complete search history.

(56) References Cited

U.S. PATENT DOCUMENTS

| | | | |
|---|---|---|---|
| 5,878,248 A * | 3/1999 | Tehranian et al. ............ 345/502 |
| 5,991,496 A | 11/1999 | Kojima |
| 6,415,095 B1 * | 7/2002 | Morishima et al. ........... 386/281 |
| 6,934,465 B1 * | 8/2005 | Iwasaki .......................... 386/248 |
| 7,016,598 B2 * | 3/2006 | Tabuchi et al. ................ 386/281 |
| 7,016,601 B1 * | 3/2006 | Yoneya et al. ................. 386/239 |
| 7,092,621 B1 * | 8/2006 | Yoshino et al. ................ 386/231 |
| 7,757,042 B2 * | 7/2010 | Yagisawa et al. ............. 711/114 |
| 2002/0001450 A1 * | 1/2002 | Tabuchi et al. ................... 386/52 |
| 2005/0114727 A1 * | 5/2005 | Corbett et al. ..................... 714/6 |
| 2005/0166084 A1 * | 7/2005 | Yagisawa et al. ................. 714/6 |

(Continued)

FOREIGN PATENT DOCUMENTS

| | | |
|---|---|---|
| JP | 5-233159 | 9/1993 |
| JP | 9-213015 | 8/1997 |
| JP | 2000-232622 | 8/2000 |
| JP | 2003-219339 | 7/2003 |

OTHER PUBLICATIONS

Partial English translation of JP 5-233159, which was cited in the IDS filed Nov. 29, 2007.

(Continued)

Primary Examiner — Kamini Patel
(74) Attorney, Agent, or Firm — Wenderoth, Lind & Ponack, L.L.P.

(57) ABSTRACT

Achieving improvement in protection of recorded data and reproduction performance and editing performance of video data and audio data, in addition to minimizing the number of disk devices, an inexpensive and high-performance video recording and reproducing apparatus (100) and a method thereof include: a first disk device and a second disk device; a mirroring unit which mirrors video data and audio data to an identical logical address employed by the first disk device and the second disk device; a reading unit which reads (i) the video data out of one of the first disk device and the second disk device, and (ii) the audio data out of another one of the first disk device and the second disk device; and a reproducing unit which reproduces, via synchronization, the video data and the audio data read by the reading unit.

17 Claims, 20 Drawing Sheets

U.S. PATENT DOCUMENTS

| | | | |
|---|---|---|---|
| 2006/0093324 A1* | 5/2006 | Yoshio et al. | 386/69 |
| 2006/0127052 A1* | 6/2006 | Furukawa et al. | 386/96 |
| 2006/0188214 A1* | 8/2006 | Higuchi | 386/46 |
| 2007/0035880 A1* | 2/2007 | Hall et al. | 360/137 |
| 2007/0154183 A1* | 7/2007 | Komi et al. | 386/96 |
| 2008/0063385 A1* | 3/2008 | Oshima et al. | 386/125 |
| 2008/0292278 A1* | 11/2008 | Imanishi et al. | 386/124 |
| 2009/0292872 A1* | 11/2009 | Ohta | 711/114 |
| 2010/0046924 A1* | 2/2010 | Ikeda et al. | 386/95 |
| 2010/0241898 A1* | 9/2010 | Yagisawa et al. | 714/6 |

OTHER PUBLICATIONS

International Search Report issued Aug. 26, 2008 in International (PCT) Application No. PCT/JP2008/001745.

Partial English translation of JP 2003-219339, which was cited in the IDS filed Jan. 4, 2010.

Partial English translation of JP 5-233159, which was cited in the IDS filed Jan. 4, 2010.

* cited by examiner

HDD structure 2

HDD structure 1

FIG. 5A
Video file recording unit
FIG. 5B
Audio file recording unit
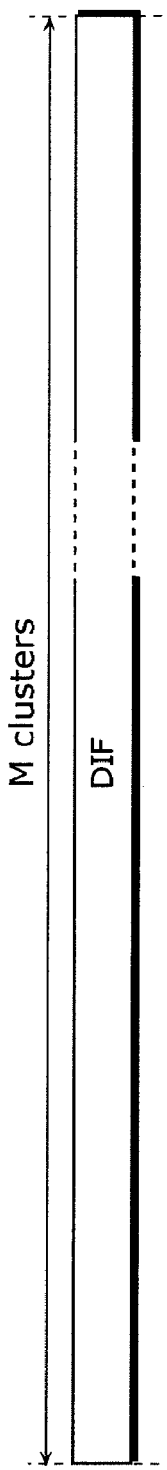
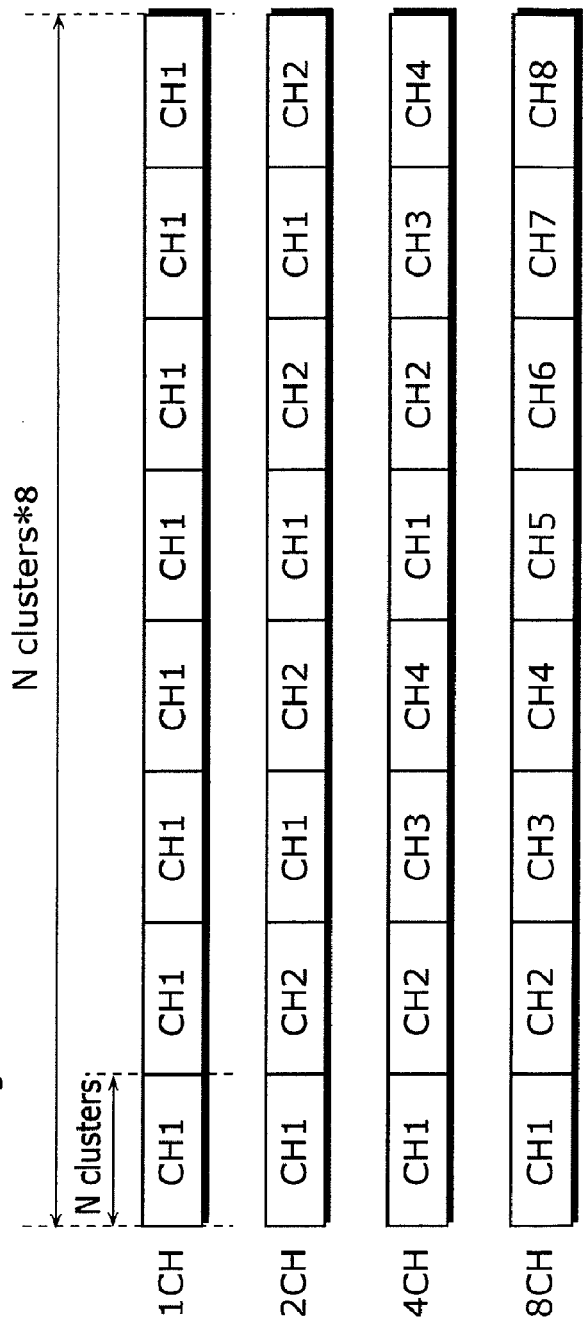

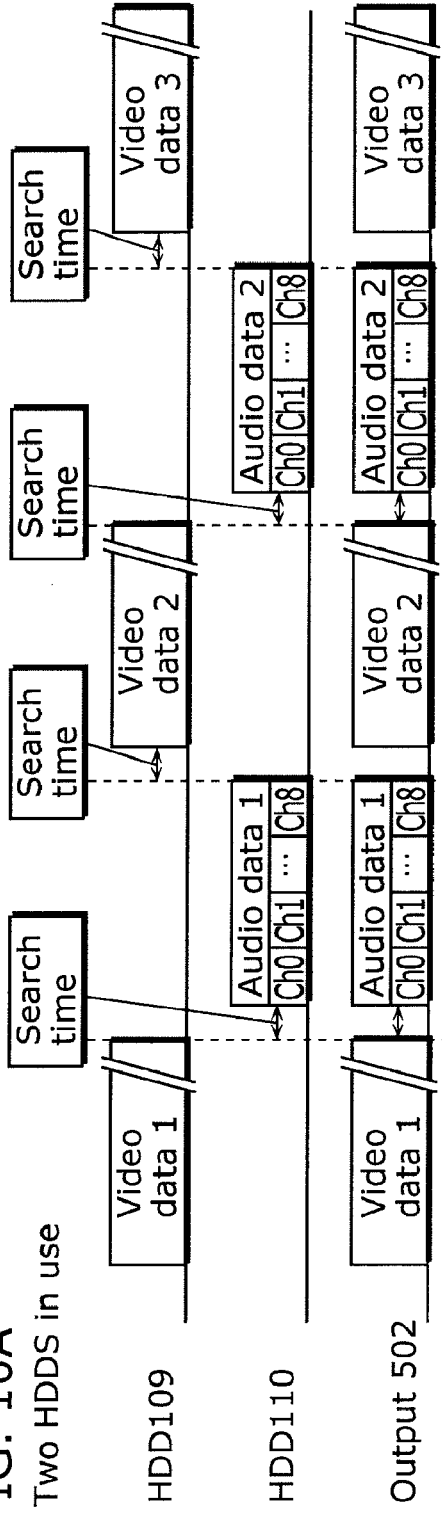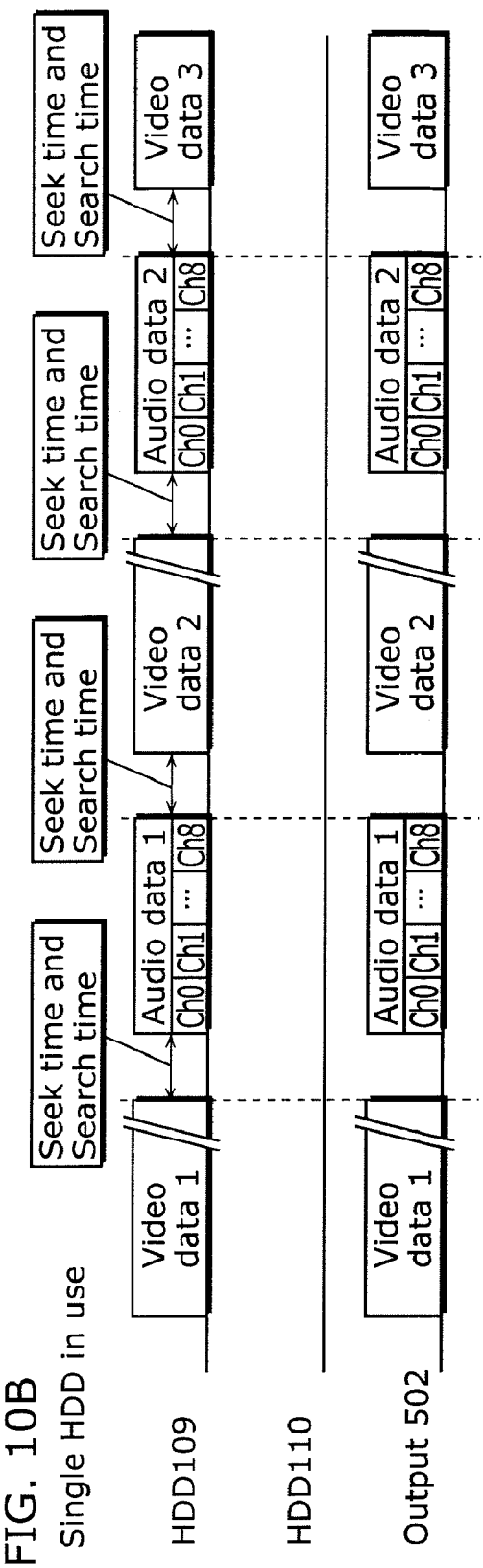

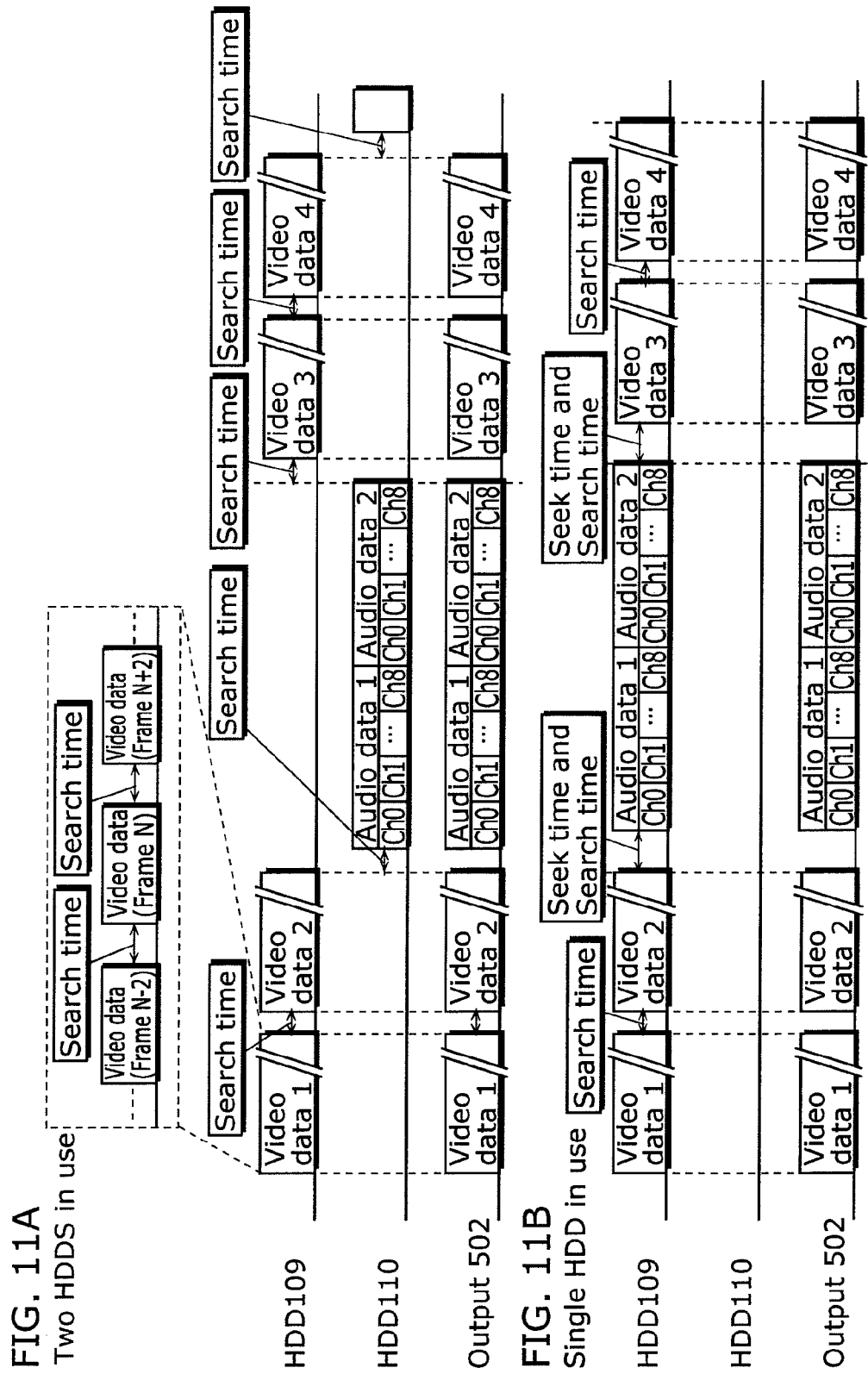

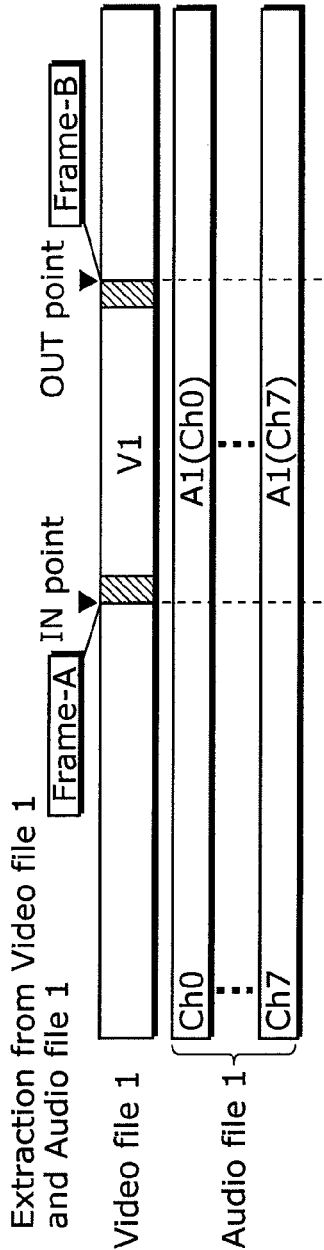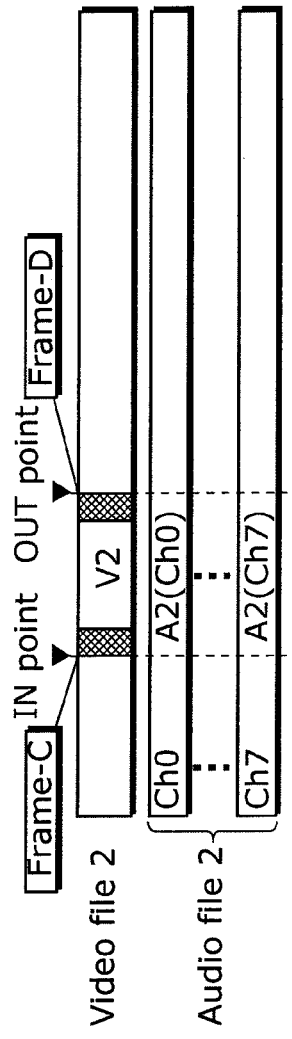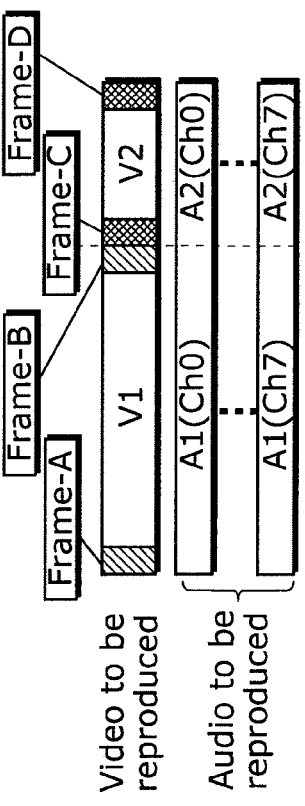
FIG. 12A Extraction from Video file 1 and Audio file 1
FIG. 12B Extraction from Video file 2 and Audio file 2
FIG. 12C Edit list
FIG. 12D Reproduction in cut edit

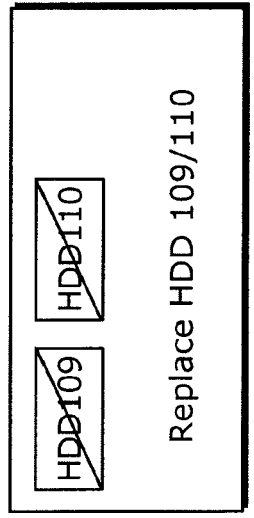
FIG. 18A Under normal operation
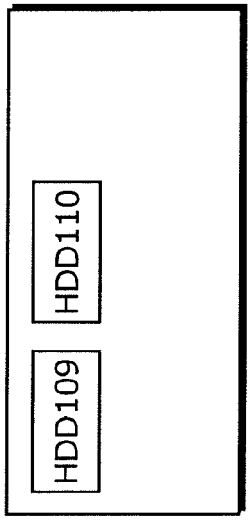
FIG. 18B Warning 1
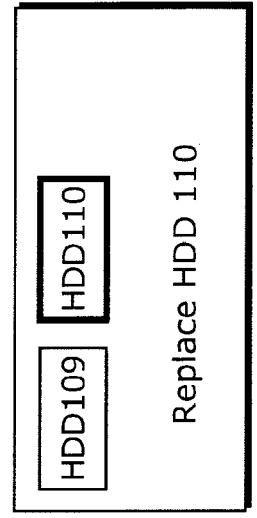
FIG. 18D Error
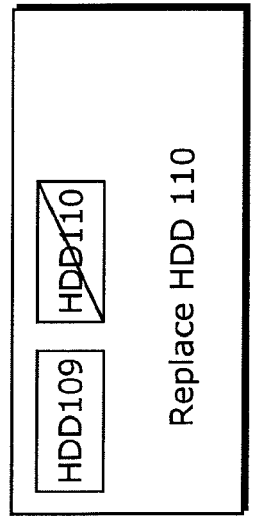
FIG. 18C Warning 2
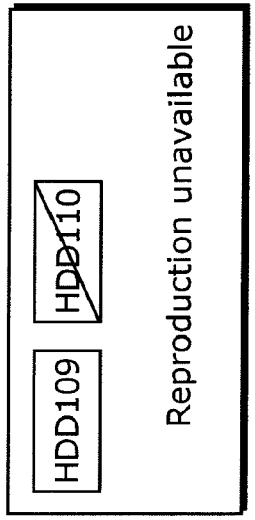
FIG. 18E Warning 3

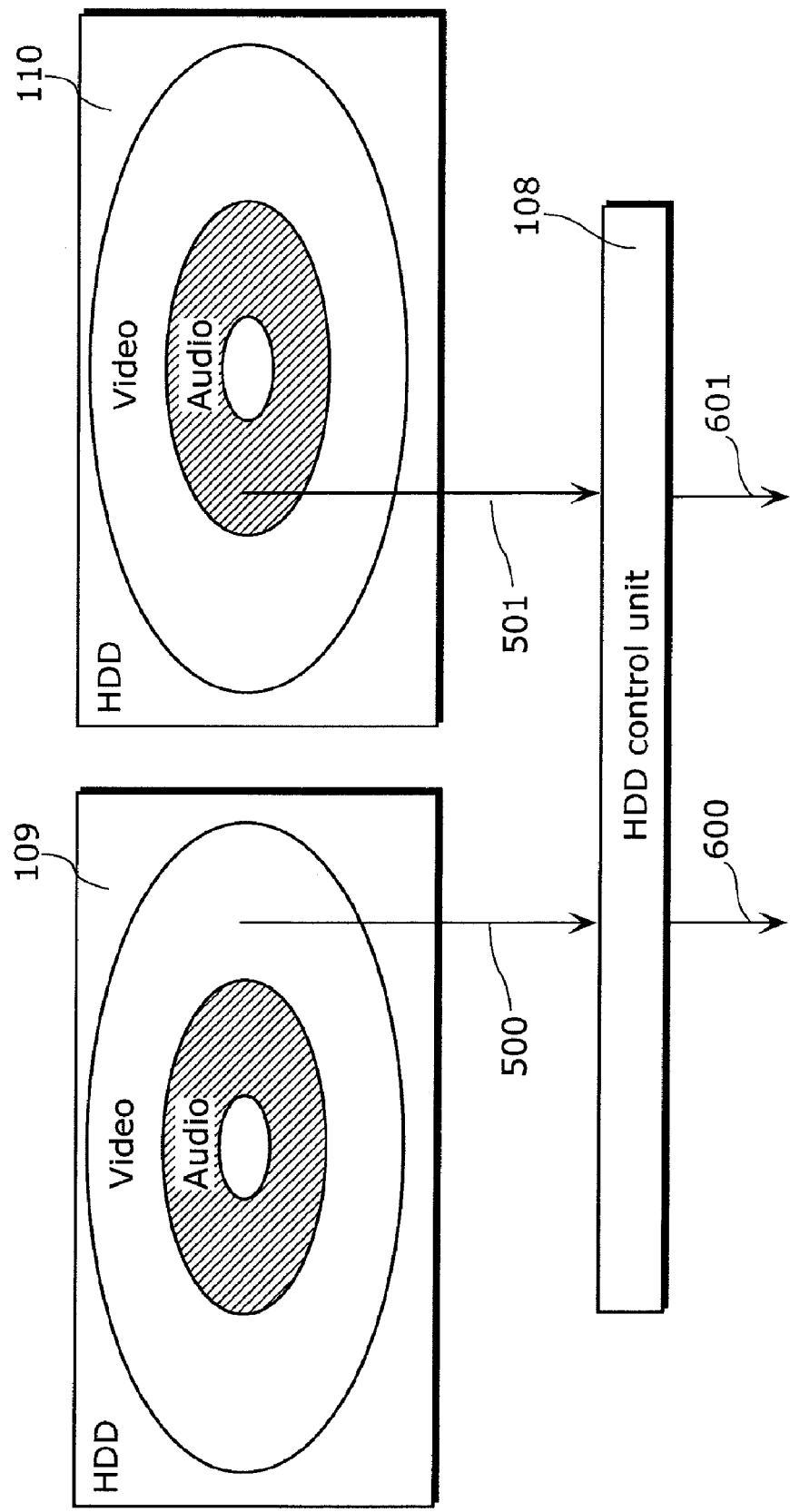

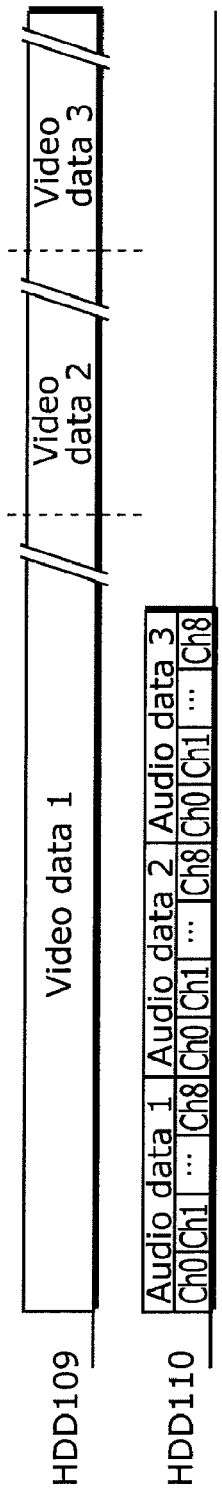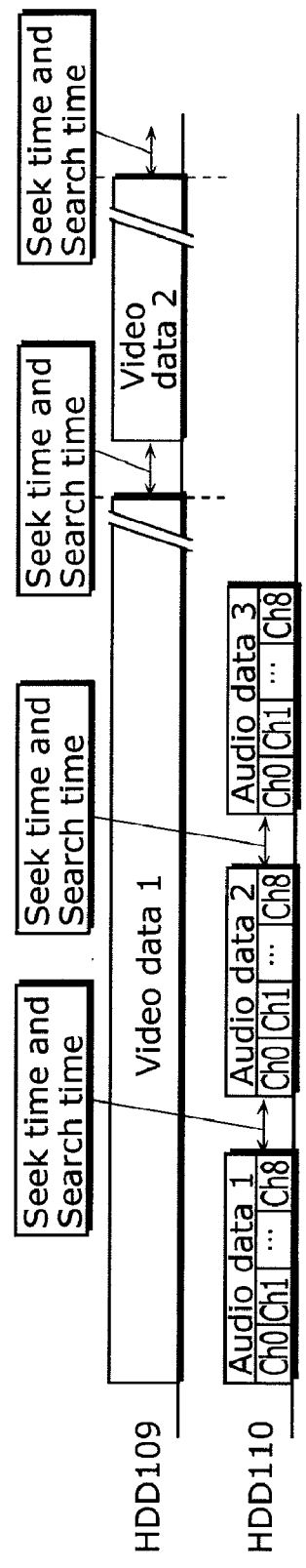
FIG. 20A
Data to be reproduced successively arranged
FIG. 20B
Data to be reproduced discretely arranged

VIDEO RECORDING AND REPRODUCING APPARATUS AND METHOD THEREOF

TECHNICAL FIELD

The present invention relates to video recording and reproducing apparatuses and methods thereof, and in particular, to a recording apparatus for recording a video and an audio on a disk device and a recording method thereof, and a reproducing apparatus for reproducing the video and the audio out of the disk device and a reproducing method thereof.

BACKGROUND ART

Magnetic tapes, including a digital video tape available at a low price and capable of recording for long hours, have been used as a typical recording medium for recording a video and an audio. Recently, disk devices are replacing the magnetic tapes as an inexpensive recording medium for recording a video and an audio since the disk devices, capable of high-speed access and random access, have achieved a higher capacity at a lower cost.

The disk devices, however, are prone to an aging failure, as well as are vulnerable to an unexpected breakdown for various causes. Thus, the use of the disk devices possibly results in a loss of valuable data.

Moreover, the structure of the disk devices causes a head to move (seek) to read data out of the disk in the disk device. Hence, frequent seeks in reproducing data on the disk devices lower a transmission rate of data from the disk device. In the case where the lowering transmission rate of the data from the disk devices goes below a data transmission rate essential to reproduction of video data and audio data, the video data and the audio data cannot be properly reproduced.

Then, proposed is an apparatus to use Redundant Arrays of Inexpensive Disks (RAID) technique for prevention of a valuable data loss to record, reproduce, and edit a video and an audio on disk apparatuses (refer to Patent Reference 1, for example).

Patent Reference 1: Japanese Unexamined Patent Application Publication No. 2000-232622

DISCLOSURE OF INVENTION

Problems that Invention is to Solve

The use of the disk device described in the above Patent Reference 1 as a recording medium requires a lot of disk apparatuses. This makes a video recording and reproducing apparatus large and expensive, which causes difficulty in downsizing and lowering the cost thereof.

The present invention is conceived in view of the above problems and has as an object to provide an inexpensive and high-performance video recording and reproducing apparatus achieving improvement in protection of recorded data and reproduction performance and editing performance of video data and audio data, in addition to minimizing the number of disk devices, and a method thereof.

Means to Solve the Problems

In order to achieve the above object, a first aspect of a video recording and reproducing apparatus in accordance with the present invention includes a first disk device and a second disk device; a mirroring unit which mirrors video data and audio data to an identical logical address employed by the first disk device and the second disk device; a reading unit which reads (i) the video data out of one of the first disk device and the second disk device, and (ii) the audio data out of another one of the first disk device and the second disk device; and a reproducing unit which reproduces, via synchronization, the video data and the audio data read by the reading unit.

The video recording and reproducing apparatus may further include a detecting unit which detects a breakdown of the first disk device and a breakdown of the second disk device, wherein, in the case where the detecting unit detects one of the breakdown of the first disk device and the breakdown of the second disk device, the reading unit may read the video data and the audio data out of another one of the first disk device and the second disk device.

In the case where neither the breakdown of the first disk device nor the breakdown of the second disk device is detected, the reading unit may read, under a first reproduction condition representing a constraint in reproduction, (i) the video data out of one of the first disk device and the second disk device, and (ii) the audio data out of another one of the first disk device and the second disk device, the first reproduction condition representing a constraint in reproduction, and in the case where one of the breakdown of the first disk device and the breakdown of the second disk device is detected by the detecting unit, the reading unit may read, under a second reproduction condition representing a constraint in reproduction, the video data and the audio data out of the another one of the first disk device and the second disk device.

Here, each of the first reproduction condition and the second reproduction condition may include a video frame update cycle of the video data.

In addition, each of the first reproduction condition and the second reproduction condition may include a continuously-reproducible data size in editing the video data or the audio data.

Further, in the case where the first disk device and the second disk device are in normal status, the reading unit may alternately read the video data and the audio data out of the first disk device and the second disk device, respectively, in a predetermined order.

Moreover, the detecting unit may detect a first state indicating one of a breakdown of the first disk device and a breakdown of the second disk device in the reproduction by the video recording and reproducing apparatus, and in the case where the first state is detected by the detecting unit, the reading unit may read the video data and the audio data out of another one of the first disk device and the second disk device in the predetermined order.

Further, the reading unit may include: a video data reading unit which reads the video data; and an audio data reading unit which reads the audio data, wherein the video data reading unit and the audio data reading unit may simultaneously read the video data and the audio data, respectively.

In addition, the video recording and reproducing apparatus may further include a switching unit which switches between the first disk device and the second disk device for every power-on of the video recording and reproducing apparatus, switched one of the first disk device and the second disk device being designated as a disk device out of which the reading unit reads the video data, wherein the reading unit may read the video data out of the one of the first disk device and the second disk device to which the switching unit switches.

Moreover, the video recording and reproducing apparatus may further include a switching unit which switches between the first disk device and the second disk device for every predetermined number of reproduction times by the video recording and reproducing apparatus, switched one of the first disk device and the second disk device being designated as a disk device out of which the reading unit reads the video data, wherein the reading unit may read the video data out of the one of the first disk device and the second disk device switched to which the switching unit switches.

Further, the video recording and reproducing apparatus may further include: a number of errors detecting unit which counts the number of errors representing the number of failures of reading out of the first disk device and the second disk device; and a selecting unit which selects one of the first disk device and the second disk device which has a smaller number of errors, wherein the reading unit may read the video data out of one of the first disk device and the second disk device selected by the selecting unit.

In addition, each of the first disk device and the second disk device may include a storage area divided into a first area and a second area, and the mirroring unit may mirror a video file in the first area and an audio file in the second area, each of the video file and the audio file being separately formed out of the video data and the audio data to be mirrored.

Moreover, the mirroring unit may assign (i) the first area to an outer circumferential area of each of the first disk device and the second disk device, and (ii) the second area to an inner circumferential area of each of the first disk device and the second disk device.

Further, the mirroring unit may assign the first area and the second area in proportion to a reproduction rate representing a data transfer rate in reproducing the video data and the audio data, the first area and the second area being included in each of said first disk device and said second disk device.

In addition, the video recording and reproducing apparatus may further include a selecting unit which selects one of (i) a first scheme for reading the video data out of one of the first disk device and the second disk device and the audio data out of another one of the first disk device and second disk device, and (ii) a second scheme involving reading both of the video data and the audio data out of one of the first disk device and the second disk device, wherein the reading unit may read the video data and the audio data according to either the first method or the second method selected by the selecting unit.

Moreover, the selecting unit may select the second method in the case where a reproduction rate is lower than a predetermined value, the reproduction rate representing a data transfer rate in reproducing the video data and the audio data.

Further, the selecting unit may select the second method in the case where a video frame update cycle of the video data is shorter than a predetermined update cycle.

In addition, the selecting unit may select the second method in the case where a continuously-reproducible data size in editing either the video data or the audio data is longer than a predetermined size.

Another aspect of the video recording and reproducing apparatus in accordance with the present invention divides an area of the disk device. An area for recording the video file is arranged on the outer circumference, and an area for recording the audio file on the inside of the disk. In recording, the video recording and reproducing apparatus performs mirroring; that is, writing the video file and the audio file into the identical logical address employed by disk devices of which disks divided into areas. In reproducing, each of the video file and the audio file is reproduced out of a different disk device. This makes possible reducing the number of seeks and the seek time of the disk devices, which improves in reproduction performance and edit performance.

Moreover, another aspect of the video recording and reproducing apparatus in accordance with the present invention employs: the recording control by mirroring; and the reproduction control reproducing each of the video file and the audio file out of a different disk device, so that the number of seeks and the seek time of the disk devices can be reduced This achieves improvement in reproduction performance and edit performance, which makes possible reproducing and editing a video file and an audio file having a higher reproduction rate. Further, the video recording and reproducing apparatus in the present invention can be downsized since realized with as few as two disk devices. Moreover, in the case where the reproduction performance and the edit performance fully satisfies the reproduction rate of the video file and the audio file, the performance requested to the disk device can be slowed down. This allows a use of an inexpensive disk device, leading to a lower cost of the video recording and reproducing apparatus.

It is noted that the present invention can be realized as: an integrated circuit including processing units which the apparatus has; steps performed by the processing units included in the apparatus; a program which causes a computer to execute these steps; and information, data and a signal indicating the program, as well as the apparatus. The program, information, data and the signal may be distributed via a recording medium, such as a CD-ROM, and a communications medium, such as the Internet.

Effect of Invention

The present invention can realize an inexpensive and high-performance video recording and reproducing apparatus achieving improvement in: protection of recorded data; reproduction performance of video data and audio data; and editing performance, in addition to minimizing the number of disk devices, and a method thereof. Thus, the practical value of the present invention is significantly high since videos and audios, prevailing in the present day and provided via high-definition broadcast, require video data in large amount and audio data corresponding to the video data.

BRIEF DESCRIPTION OF DRAWINGS

FIG. 5A illustrates a recording unit of the video file in the first embodiment of the present invention. FIG. 5B illustrates a recording unit of the audio file in the first embodiment of the present invention.

FIG. 10A illustrates a reproducing method for performing normal reproduction using two of HDDS in the first embodiment of the present invention. FIG. 10B illustrates a reproducing method for performing the normal reproduction using one of the HDDS in the first embodiment of the present invention.

FIG. 11A illustrates a reproducing method for performing reproduction in special mode using two of the HDDS in the first embodiment of the present invention. FIG. 11B illustrates a reproducing method for performing reproduction in special mode using one of the HDDS in the first embodiment of the present invention.

FIG. 12A illustrates a clipping method for extracting data from a video file 1 and an audio file 2 in a cut edit in the first embodiment of the present invention. FIG. 12B illustrates an extracting method for clipping data from a video file 2 and the audio file 2 in the cut edit in the first embodiment of the present invention.

FIG. 12C shows an edit list determining a reproducing order of the pieces of data clipped in the cut edit in the first embodiment of the present invention. FIG. 12D shows a reproducing order of the pieces of data clipped from the edit list in the cut edit in the first embodiment of the present invention.

FIGS. 18A to 18E exemplify operational status of two of the HDDS in the first embodiment of the present invention.

FIG. 19 illustrates a control method for reading a video file and an audio file in a third embodiment of the present invention out of HDDS.

FIG. 20A illustrates a reproducing method for reading a video file and an audio file, which are successively arranged, with a use of two HDDS in the third embodiment of the present invention. FIG. 20B illustrates a reproducing method for reading a video file and an audio file, which are discretely arranged, with a use of the two HDDS in the third embodiment of the present invention.

NUMERICAL REFERENCES

Figure 1:
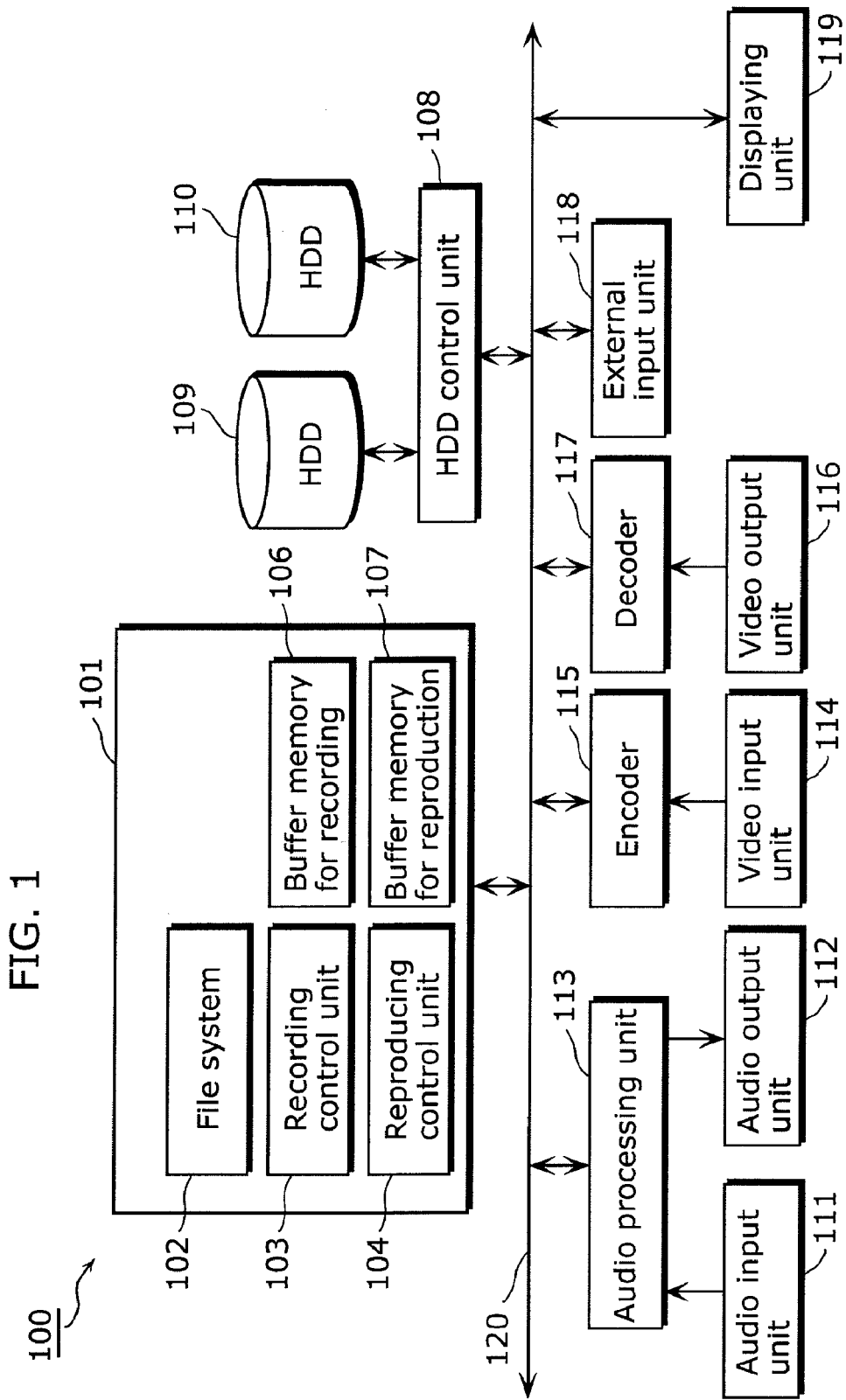
FIG. 1 is a block diagram illustrating a structure of a video recording and reproducing apparatus in a first embodiment of the present invention.

100 Video recording and reproducing apparatus
101 System control unit
102 File system
103 Recording control unit
104 Reproducing control unit
106 Buffer memory for recording
107 Buffer memory for reproduction
108 HDD control unit
109 and 110 HDD
111 Audio input unit
112 Audio output unit
113 Audio processing unit
114 Video input unit
115 Encoder
116 Video output unit
117 Decoder
118 External input unit
119 Displaying unit
120 I/O bus
200 Storage area
201 and 202 Area
300 Disk
301 Head
302 Access arm
303 Track
304 Sector
305 Cluster
400, 403, and 501 Bus for writing an audio file
401, 402, and 500 Bus for writing a video file
404 Data
600, and 601 Bus

BEST MODE FOR CARRYING OUT INVENTION

First Embodiment

FIG. 1 is a block diagram illustrating a structure of a video recording and reproducing apparatus in a first embodiment of the present invention. A video recording and reproducing apparatus 100 includes a system control unit 101, a hard disk drive (HDD) control unit 108, an HDD 109, an HDD 110, an audio input unit 111 into which an audio signal is inputted, an audio output unit 112 outputting the audio signal, an audio processing unit 113, a video input unit 114 into which a video signal is inputted, an encoder 115 encoding the inputted video signal, a decoder 117 decoding the video signal, a video output unit 116 outputting the decoded video signal, an external input unit 118, a displaying unit 119, and an I/O (INPUT/OUTPUT) bus 120. Here, the HDD control unit 108 is under the control of the system control unit 101 to control hard disk devices (referred to as HDDS, hereinafter). The audio processing unit 113 mutes, fades in and out, and controls volume of the audio. The external input unit 118 receives instructions of a user, such as record and reproduction of a file having video data and audio data. The displaying unit 119 displays for the user a state of recording and reproducing.

The system control unit 101 is realized by a computer including, for example, the CPU and a memory. The system control unit 101 includes a file system 102, a recording control unit 103, a reproducing control unit 104, a buffer memory for recording 106, and a buffer memory for reproduction 107.

The file system 102 utilizes a unit referred to as a sector to form a file and a directory, and comprehends that each of sectors is used for which file, and that which sector is unused.

The recording control unit 103 accumulates the video data and the audio data in the buffer memory for recording 106, the video data and the audio data which is transferred from the audio processing unit 113 and the encoder 115 via the I/O bus 120. In addition, the recording control unit 103 controls the HDD control unit 108 to write the video data and the audio data, transferred from the buffer memory for recording 106 via the I/O bus 120, into the two HDD (the HDD 109 and the HDD 110).

The reproducing control unit 104, equivalent to a reproducing unit in the present invention, synchronizes the video data and the audio data read by the reading unit, and reproduces the synchronized video data and audio data. Specifically, the reproducing control unit 104 controls the HDD control unit 108 to read the video data and the audio data out of the two HDDS (the HDD 109 and the HDD 110), the video data and the audio data which is to be transferred to the buffer memory for reproduction 107. Moreover, the reproducing control unit 104 transfers the video data and the audio data, transferred from the buffer memory for reproduction 107 via the I/O bus 120, to the audio processing unit 113 and the encoder 115.

The buffer memory for recording 106 stores the audio data and the video data. Here, the recording control unit 103 transfers to the buffer memory for recording 106 via the I/O bus 120: the audio data inputted into the audio input unit 111 and processed by the audio processing unit 113; and the video data inputted into the video input unit 114 and encoded by the encoder 115.

The buffer memory for reproduction 107 stores the audio data and the video data. Here, the reproducing control unit 104 transfers via the I/O bus 120 the audio data and the video data from the HDD control unit 108 to the buffer memory for reproduction 107.

The recording control unit 103 and the reproducing control unit 104 included in the system control unit 101 are realized by the CPU executing various programs. The buffer memory for recording 106 and the buffer memory for reproduction 107 included in the system control unit 101 may be realized, for example, by memories each designated for an associated usage (record/reproduction and video/audio), or by a single memory in which areas are each assigned to a corresponding usage (record/reproduction and video/audio).

The video signal and the audio signal, along with additional information, are formed into a file and recorded in the HDD 109 and the HDD 110. The video signal, forwarded from the video input unit 114, is compressed by the encoder 115 into video data of which code amount is reduced to approximately one sixth as small as that of the video signal through, for example, compression according to the SMPTE-370M (DV-Based 100M). On the 1080/60i system, a data amount per frame is 480,000 bytes (576,000 bytes on the 1080/50i system) in fixed amount.

Figure 2:
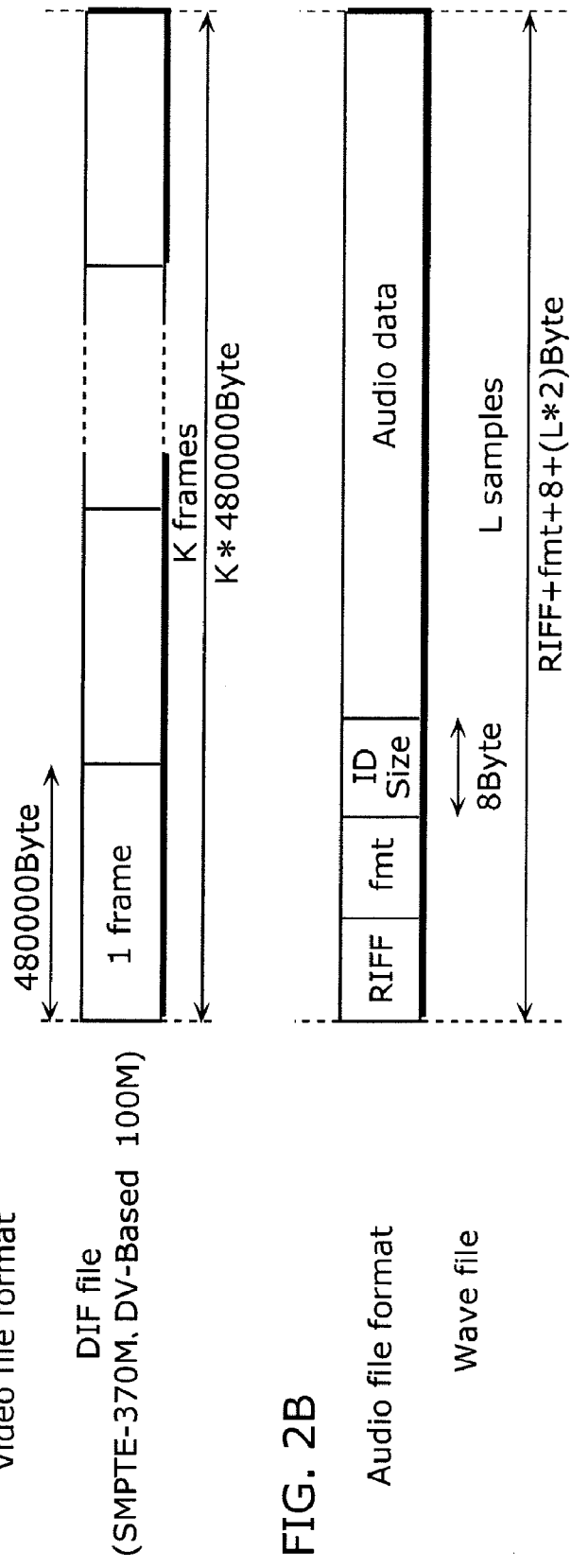
FIG. 2A illustrates a video file format in the first embodiment of the present invention.
FIG. 2B illustrates an audio file format in the first embodiment of the present invention.

FIG. 2A illustrates a video file format in the first embodiment of the present invention. As shown in FIG. 2A, the file type is the Digital Interface Format (DIF), which is formed to have pieces of compressed data in an order of frames with no header. Thus, a DIF file size when recording k frames according to the DIF becomes k times as large as the code amount per frame. It is noted that a Motion Picture Experts Group (MPEG) standard may be used as the file type, instead of the DIF.

In addition, the DIF file according the SMPTE-370M (DV-Based 100M) can store data as much as eight channels of audio. In the first embodiment, however, the audio data is recorded in a separate file rather than is stored in the DIF file. This is because a business-oriented editorial operation at a broadcast station often involves separately editing the video data and the audio data. Thus, a typical industrial nonlinear editor records the video data and the audio data in a separate file.

Further, the audio signal provided from the audio input unit 111 receives processing on the audio processing unit 113, such as muting, fading in and out, channel mixing, and level adjusting. Then, the processed audio signal is formed into a file in the WAVE format for each channel.

FIG. 2B illustrates an audio file format in the first embodiment of the present invention. FIG. 2B exemplifies an WAVE format file.

The WAVE file, one of the formats in the Resource Interchange File Format (RIFF), includes plural chunks with "description of data" and "data" recorded in order. Each of the plural chunks includes a four-letter ID (ASCII 4 Byte), a four-byte chunk data size, and chunk data as actual data. FIG. 2B shows that the file is in the WAVE format, and has at its head the RIFF chunk indicating a kind of the RIFF. The fmt chunk, defining the format, stores information on a structure of the file, such as a sampling frequency and a quantization rate of the audio data stored in the file. The data chunk indicating the audio data stores the data chunk ID, and data chunk size, followed by actual audio data. The following is a file size where the quantization rate of an audio is 16 bits:

File size=$RIFF+fmt+8+(L\times 2)$ Byte

RIFF=the number of bytes in the REFF chunk
fmt=the number of bytes in the fmt chunk
L=the number of total samples in the audio data It is noted that the audio file is recorded for each channel. In other words, when there are eight channels for recording an audio, eight audio files are independently created for each of the channels.

The HDD control unit 108, equivalent to a mirroring unit in the present invention, mirrors the video data and the audio data onto the identical logical address employed by the first and the second disk devices. Specifically, the HDD control unit 108 issues a write instruction to the two HDDS (the HDD 109 and the HDD 110) in order to instruct the HDDS to write the video data and the audio data into the identical logical addresses employed by the two HDDS (the HDD 109 and the HDD 110), the video data and the audio data which is transferred from the buffer memory for recording 106.

Further, the HDD control unit 108, equivalent to a read unit of the present invention, reads the video data from one of the first disk device and the second disk device, and reads the audio data from the other one of the first disk device and the second disk device. Specifically, the HDD control unit 108 issues a read instruction to the two HDDS (the HDD 109 and the HDD 110) to read the video data from one of the two HDDS (the HDD 109 and the HDD 110), and the audio data from the other one of the two HDDS (the HDD 109 and the HDD 110) in order to transfer to the buffer memory for reproduction 107 the video data and the audio data stored in the two HDDS (the HDD 109 and the HDD 110).

Moreover, the HDD control unit 108 transfers the video data and the audio data between the buffer memory for recording 106, the buffer memory for reproduction 107, the HDD 109, and the HDD 110.

The HDDS 109 and 110 are equivalent to the first and second disk devices in the present invention. Specifically, the HDDS 109 and 110, including for example a versatile I/F (interface, referred to as I/F, hereinafter) such as the Serial-ATA, are each separately connected to the HDD control unit 108. According to the instruction issued by the HDD control unit 108, the HDDS 109 and 110 write the video data and the audio data, transferred from the HDD control unit 108 to be provided, into magnetic disks of the HDDS 109 and 110. Further, according to the instruction issued by the HDD control unit 108, the HDDS 109 and 110 separately read each of the video data and the audio data, stored in the HDDS 109 and 110, from the magnetic disks of the HDDS 109 and 110, and provide the read video data and the audio data to the HDD control unit 108.

Figure 3:
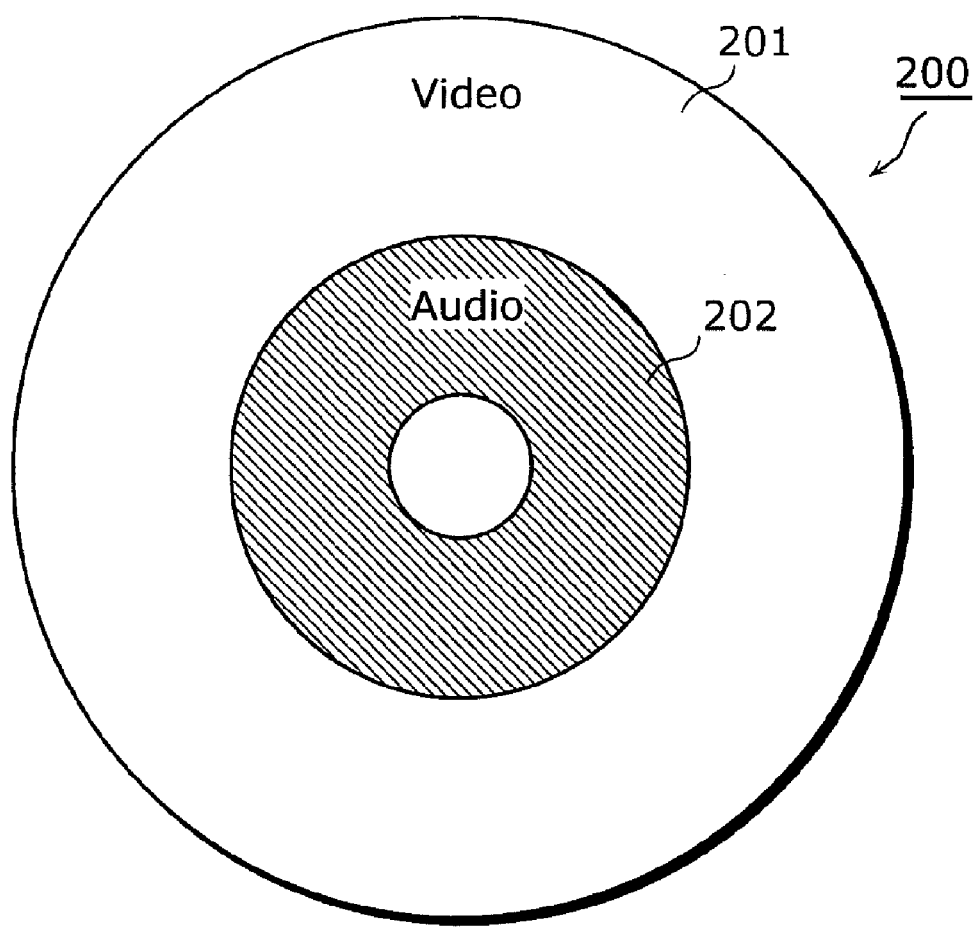
FIG. 3 shows that a storage area of a Hard Disk Drive (HDD) in the first embodiment of the present invention is divided into a video file and an audio file.

FIG. 3 shows that a storage area of an HDD in the first embodiment of the present invention is divided into the video file and the audio file.

A storage area 200 in the HDDS 109 and 110 is equivalent to a storage area in the present invention. Each of the first disk device and second disk device is divided into a first area and a second area. Specifically, the storage area 200 is divided into two areas; namely an outer circumference and an inner circumference as shown in FIG. 3. The outer circumferential area is designated as an area 201 for the video file, and the inner circumferential area as an area 202 for the audio file.

A typical HDD records and reproduces at a constant rotational speed. Thus, a transfer rate of data increases as the data is recorded and reproduced in circumferential part further from the center. Hence, it is suitable to assign areas of the magnetic disk in the order of a higher reproduction rate to be required. In other words, a video file area, needed to have a high reproduction rate, is assigned to the area 201 provided in the outer circumferential area, and an audio file area, of which reproduction rate is lower than that of the video file, is assigned to the area 202 provided in the inner circumferential area with respect to the video file. Here, the reproduction rate is a data transfer rate required for reproduction. It is noted in determining capacity of the storage area (areas for the area 201 assigned to the video file, and the area 202 assigned to the audio file) that the first area and the second area both assigned to each of the first disk device and the second disk device may be divided to be provided according to a ratio of the reproduction rate which is a data transfer rate when reproducing the video data and the audio data. By determining the capacity of the storage area based on a ratio of a reproduction rate between the video file and the audio file; that is the ratio of the reproduction rate between the video data and the audio data on a unit time basis, the storage area 200 can be economically utilized.

Next described are writing and reading operations to and from each of the area 201 assigned to the video file and the area 202 assigned to the audio file.

Figure 4B:
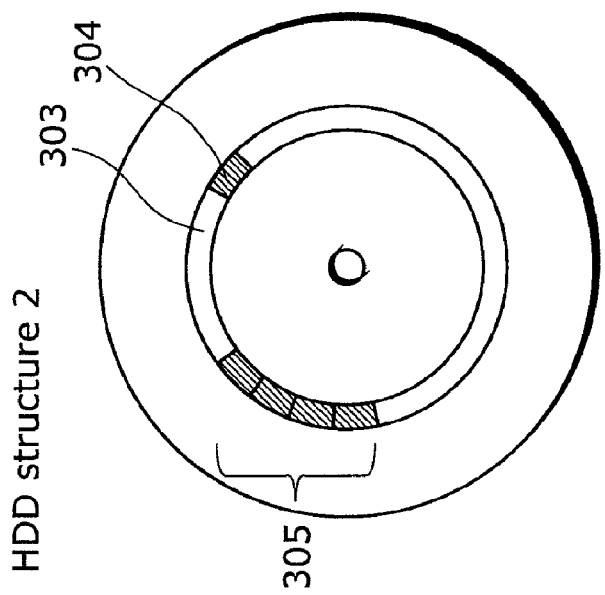
FIGS. 4A and 4B illustrate a structure of the HDD in the first embodiment of the present invention.
Figure 4A:
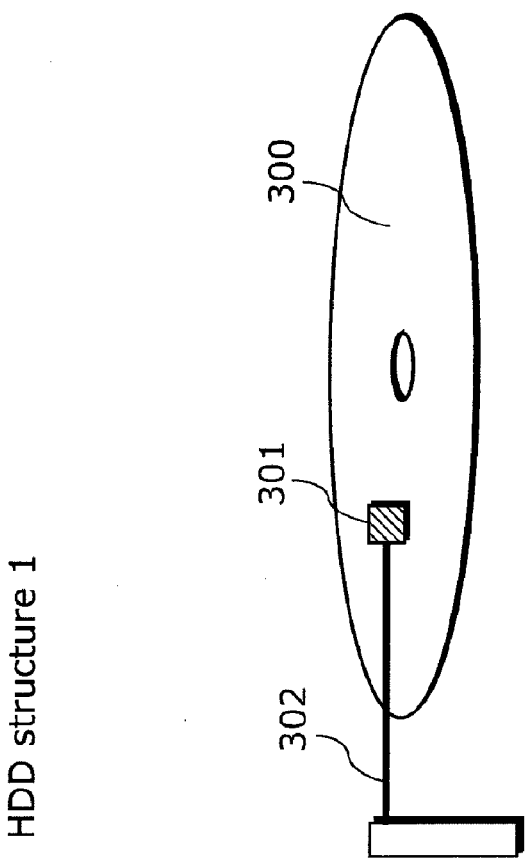

FIGS. 4A and 4B illustrate a structure of the HDD in the first embodiment of the present invention.

The disk device in the HDDS 109 and 110, including a magnetic disk 300, a head 301, and an access arm 302, concentrically records the video data and the audio data on the magnetic disk 300. The magnetic disk 300 rotates at a rate of several thousands per minutes, and the head 301 attached to one end of the access arm 302 moves across the outer circumference and the inner circumference of the magnetic disk 300 to read and write the video data and the audio data.

In addition, a concentric portion is referred to as a track 303. The data is recorded in sectors 304 each of which further breaks the portion; namely the track 303, into parts.

Further, the Logical Block Addressing (LBA) technique is often used to access any given sector 304. According to the technique, all the sectors 304 in the HDDS 109 and 110 are sequentially numbered, and one of the sequential numbers is specified to gain to access the any given sector 304. It is noted that the user can record the data as many as 512 bytes per sector 304.

Using the sectors 304 to form a file and a directory, the file system 102 comprehends that each of the sectors 304 is used for which file, and that which sector 304 is unused. On the File Allocation Tables (FAT), for example, the data is recorded in clusters 305 each including physically sequential several sectors 304 organized on the magnetic disk, rather than recorded in the sectors 304. Hereinafter, in the first embodiment, the FAT is utilized and the description is provided as each cluster is as large as 32 KB.

In reading and writing the video data and the audio data from and to the above described magnetic disks (the HDDS 109 and 110), a target data shall be read and written, following the process below.

1. Move the head 301 to a target position of the magnetic disk (referred to as seek time, hereinafter).

2. Wait until a target sector 304 on the magnetic disk travels to the head 301 (referred to as search time, hereinafter).

3. Read and write as much data as necessary via the head 301 (referred to as data read and write time, hereinafter).

Here, calculated as follows is an access time indicating a time from the start of an operation reading and writing the data to the end of the operation reading and writing the data:

$$\text{Access time} = \text{seek time} + \text{search time} + \text{data read and write time}$$

In recording the video file and the audio file, the video data and the audio data forwarded at a constant transmission rate needs to be recorded in the HDDS 109 and 110 without failure of the buffer memory for recording 106, followed by interruption of the data. Further, frequent occurrences of the seek time and the search time in the access time except the data read and write time result in an increase in the access time, which causes a decrease in a recording rate. Taking the above into consideration, an arrangement rule is adopted to consecutively arrange pieces of data on the disks of the HDDS 109 and 110, as well as timing to write the video file and the audio file in the disks is controlled. This guarantees seamless recording with no data missing.

Here in the first embodiment, a recording unit of the audio file is intended to have N clusters per channel on the magnetic disks of the HDDS 109 and 110. An audio file includes each of the N clusters per channel consecutively arranged as many recordable channels as possible in the system. Further, a recording unit of the video file; namely an M cluster, is designated with respect to the greatest recording rate used in the system, and the M cluster covers the number of video frames having not less than a time reproducible with the N clusters for the audio file.

FIGS. 5A and 5B respectively illustrate a recording unit of the video file and a recording unit of the audio file in the first embodiment of the present invention.

Here, the recording unit of the audio file is assumed to be 32 clusters (four clusters×eight channels) where the number of clusters for an audio N=4 holds, a sampling rate of the audio is 48 kHz, a quantization bit rate is 16 bits, the number of audio recording channels is eight, and a video recording rate is the SMPTE 370 (DV-Based 100M). When the number of audio recording channels is smaller than eight channels, such as one or two channels, the channels are repeatedly arranged for every four clusters (four clusters×one channel), or eight clusters (four clusters×two channels) as shown in FIG. 5B. Here, the recording unit of the video file is 600 clusters (18.75 MB), which is equivalent to the number of video frames as long as 1.365 seconds that cover a reproducible time with four clusters of the audio file.

It is noted that the first embodiment involves recording, reproducing, deleting, and searching for a free space in the HDD on a recording unit basis of each file described above. In addition, a switching timing between the record and the reproduction of the audio file and the video file is assumed to be provided on a recording unit basis of each file.

Here, a larger recording unit means a longer switching timing of recording between the audio file and the video file. This enables to reduce frequency of the seek and the search. Hence, a guaranteed transmission capability in recording (a record guarantee rate) can be improved.

Meanwhile, both pieces of data, the video data and the audio data, are required in reproducing. Thus, a too large recording unit takes much time to accumulate both pieces of data, the video data and the audio data, in the buffer memory for reproduction 107 when starting the reproduction. This deteriorates reproduction responsiveness.

As described above, the optimum recording unit can be calculated out of the record guarantee rate and a recording rate or reproduction responsiveness of an actual video and an actual audio. Described as follows are expressions to calculate the record guarantee rate (Rrec):

$$Rec=(Dv+Da)/((Tv+Ts+Tsh)+(Ta+Ts+Tsh))$$

Dv=The recording unit of the video file (Byte)
Da=The recording unit of the audio file (Byte)
Tv=The transmission time of Dv (sec)
Ta=The transmission time of Da (sec)
Ts=The seek time involved in switching a record area between the video data and the audio data
Tsh=The search time (sec)

Described as follows are a recording control method and a reproducing control method of the video data and the audio data in the video recording and reproducing apparatus 100.

Figure 6:
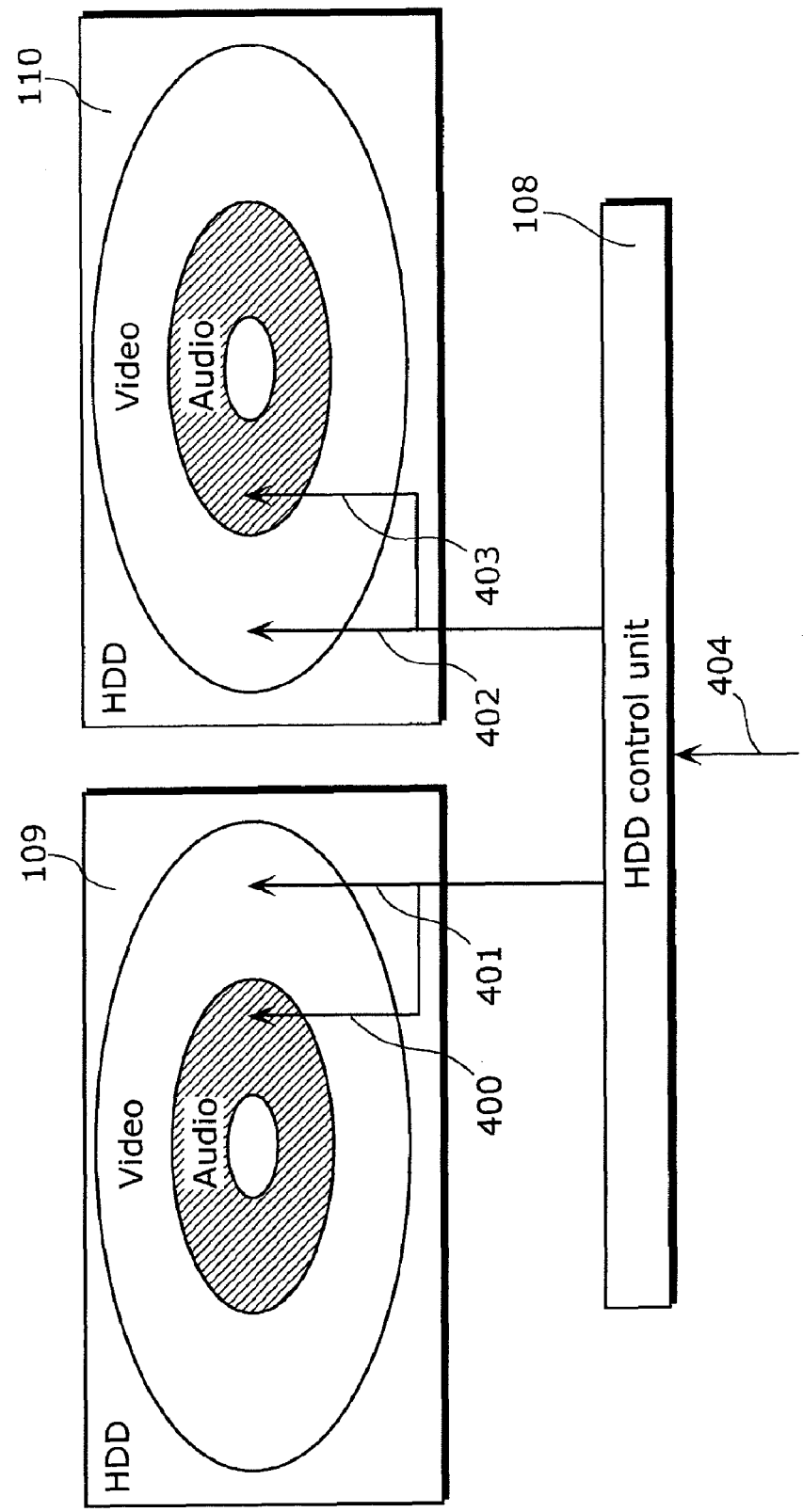
FIG. 6 illustrates a write control method for writing the video file and the audio file into the HDD in the first embodiment of the present invention.

Described first is the recording control method of the video data and the audio data in the video recording and reproducing apparatus 100 with reference to FIG. 6.

FIG. 6 illustrates a write control method for writing the video file and the audio file into the HDD in the first embodiment of the present invention. The recording operation of the video data and the audio data; that is writing into the HDDS 109 and 110, is executed according to an instruction from the external input unit 118.

When the instruction to start recording is provided from the external input unit 118, the video data is recorded in a single DIF video file to be recorded, and the audio data is recorded in eight Wave files to be recorded (the video data and the audio data referred to as record data 404, hereinafter). When the record data 404 is data 404A for the video file, the HDD control unit 108 issues Write instructions (401/402) to the HDDS 109 and 110. Here, each of the Write instructions is for writing an identical piece of data 404A into an identical logical block address (LBA) in the area 201 of the video file. When the record data 404 is data 404B for the audio file, the HDD control unit 108 controls the area 202 of the audio file in a similar manner as the video file is controlled. In other words, the HDD control unit 108 issues Write instructions (400/403) each for writing an identical piece of data 404B into an identical logical block address (LBA) in the area 202 of the audio file. Thus, when the recording operation normally ends, the identical pieces of data 404A and 404B are recorded in the identical logical block addresses in both of the HDDS (the HDDS 109 and 110).

Described next is error treatment when an error occurs in the above recording control.

Figure 7:
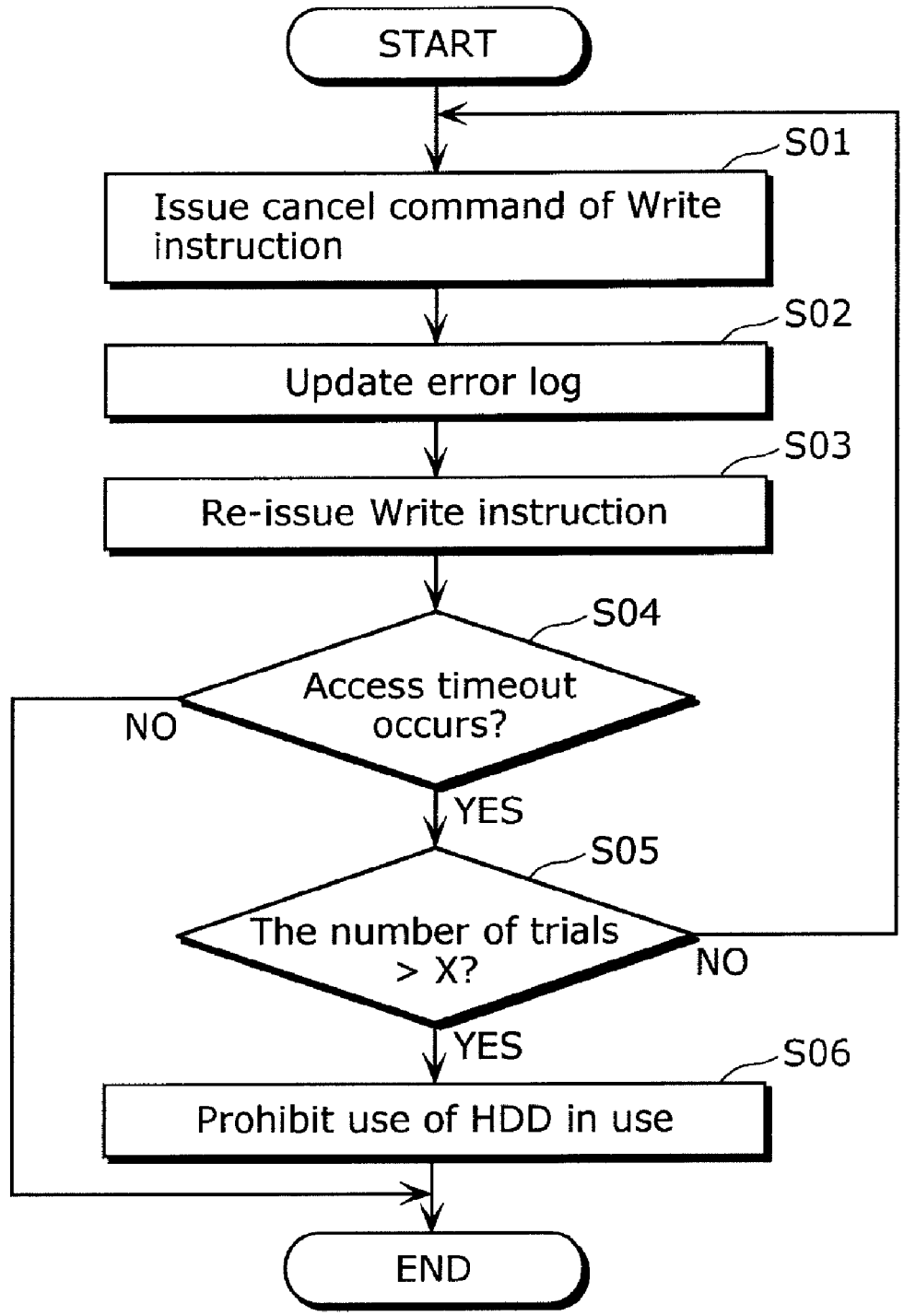
FIG. 7 is a flowchart showing error treatment in the writing in the first embodiment of the present invention.

FIG. 7 is a flowchart showing error treatment in the writing in the first embodiment of the present invention.

Upon issuing the Write instructions to the HDDS 109 and 110, in the case where no Write completion notification is sent from the HDDS 109 or 110 to the HDD control unit 108 within a predetermined timeout period, the HDD control unit 108 determines that a timeout error has occurred, and starts error treatment.

First, when the timeout error occurs, the HDD control unit 108 issues a cancel command of the Write instruction to the HDD having the timeout error (S01), and updates an error log (S02).

Then, the HDD control unit 108 re-issues the Write instruction to the HDD 109 or the HDD 110 having the timeout error (S03).

When no timeout occurs here, the HDD control unit 108 goes back to normal processing (S04: NO).

Next, when the timeout error occurs again (S04: YES), the HDD control unit 108 goes back to the state S01 issuing the Write instruction cannel command (S05: NO), so that S01 to S05 are executed until the number of trials exceeds X times.

When the number of trials exceeds X times, the HDD control unit 108 determines that an HDD in use (the HDD 109 or the HDD 110) has developed a breakdown (S05: YES), and prohibits recording and reproducing in and out of the HDD in failure (the HDD 109 or the HDD 110) until the failed HDD is replaced (S06).

It is noted, for example, that the access timeout period is assumed to be set to Tv×2 or Ta×2 (Te) calculated using the expressions for calculating the recording rate, and the number of trial X times is assumed to be set so that a data amount accumulated in the buffer memory for recording 106 occupies a half of the memory capacity in a Te×X time period. This prevents the memory capacity of the buffer memory for recording 106 to be overflowed when a timeout error occurs.

In the case where the trial times cannot be set to X; that is enough trial times cannot be set, the HDD with the timeout error occurred (HDDS 109 or 110) is once disconnected from the system. The other remaining normal HDD (the HDD 109 or 110) is used to continue the recording operation. When the recording ends, the data is copied onto the HDD with the timeout error occurred (the HDD 109 or 110) or another HDD. This assures as great reliability as the mirroring enjoys. Even though data reliability in recording to a single HDD is low compared with mirroring to two HDDS, this enables a continuous recording operation with no interruption when one of the HDD (HDDS 109 or 110) has developed a breakdown.

Since the expressions to calculate the above record guarantee rate presume simultaneous recording on the two HDDS (HDDS 109 and 110), similar expressions are utilized in the recording on a single HDD. This allows a recording operation in recording only on a single HDD to be performed at the record guarantee rate similar to the recording on the two HDDS. In other words, recording data can be protected while minimizing the number of the disk devices.

Figure 8:
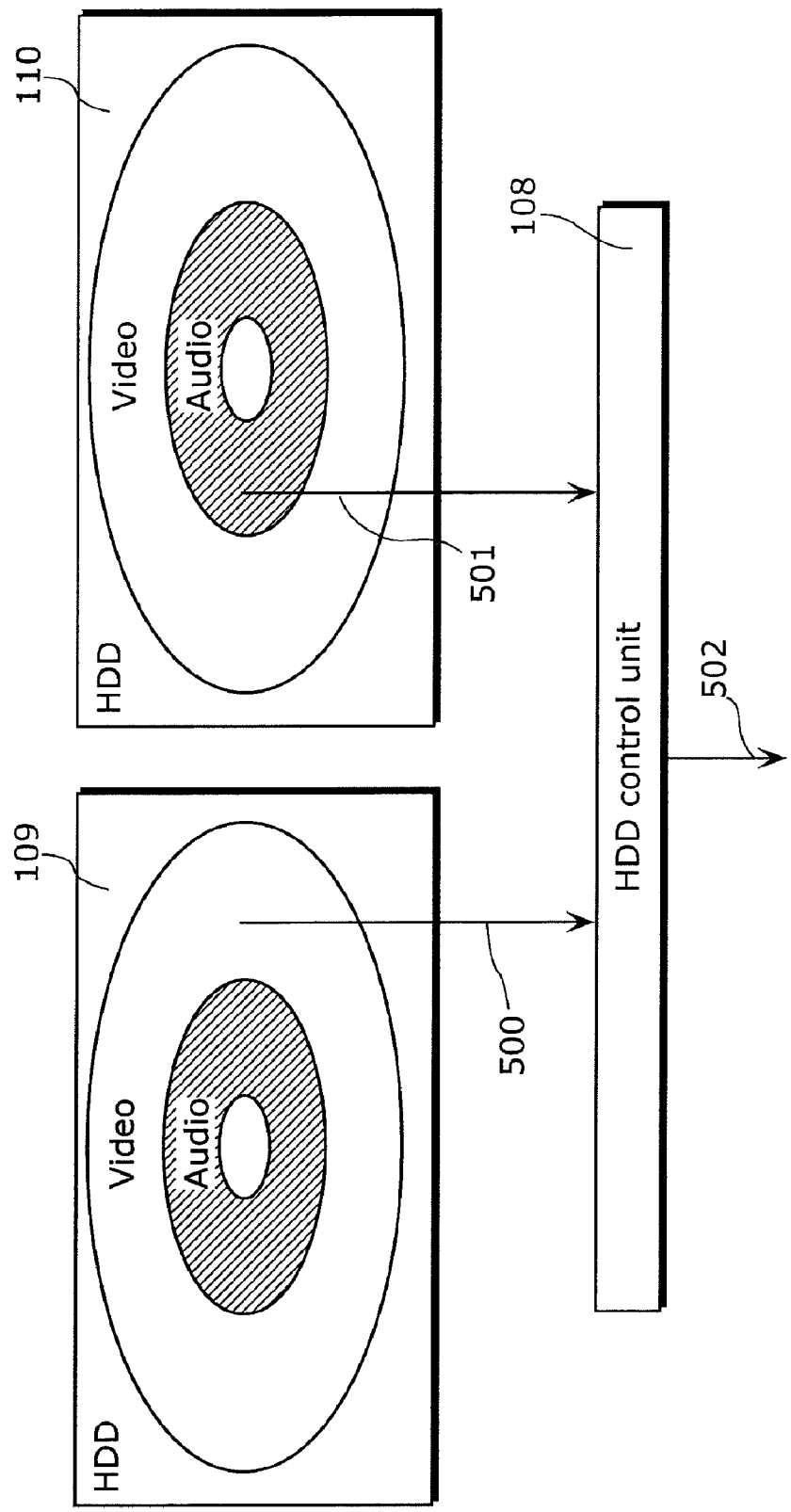
FIG. 8 illustrates a read control method for reading the video file and the audio file in the first embodiment of the present invention out of the HDD.

Next described in FIG. 8 is reproducing controls on the video data and the audio data in the video recording and reproducing apparatus 100.

FIG. 8 illustrates a control method for reading the video file and the audio file in the first embodiment of the present invention out of the HDDS 109 and 110.

FIG. 8 shows that the HDD control unit 108 reads the video data and the audio data out of the HDD 109 and the HDD 110, respectively, and controls to alternately read the video data and the audio data.

The following describes each of three reproduction controls, including the normal reproduction, the reproduction in special mode, and the cut edit. Each of the reproduction controls is further detailed with the cases in using two HDDS and only a single HDD. It is noted that switching between the use of the two HDDS and the use of the single HDD shall be described hereinafter.

Described first is a reproduction control in the normal reproduction.

Figure 9:
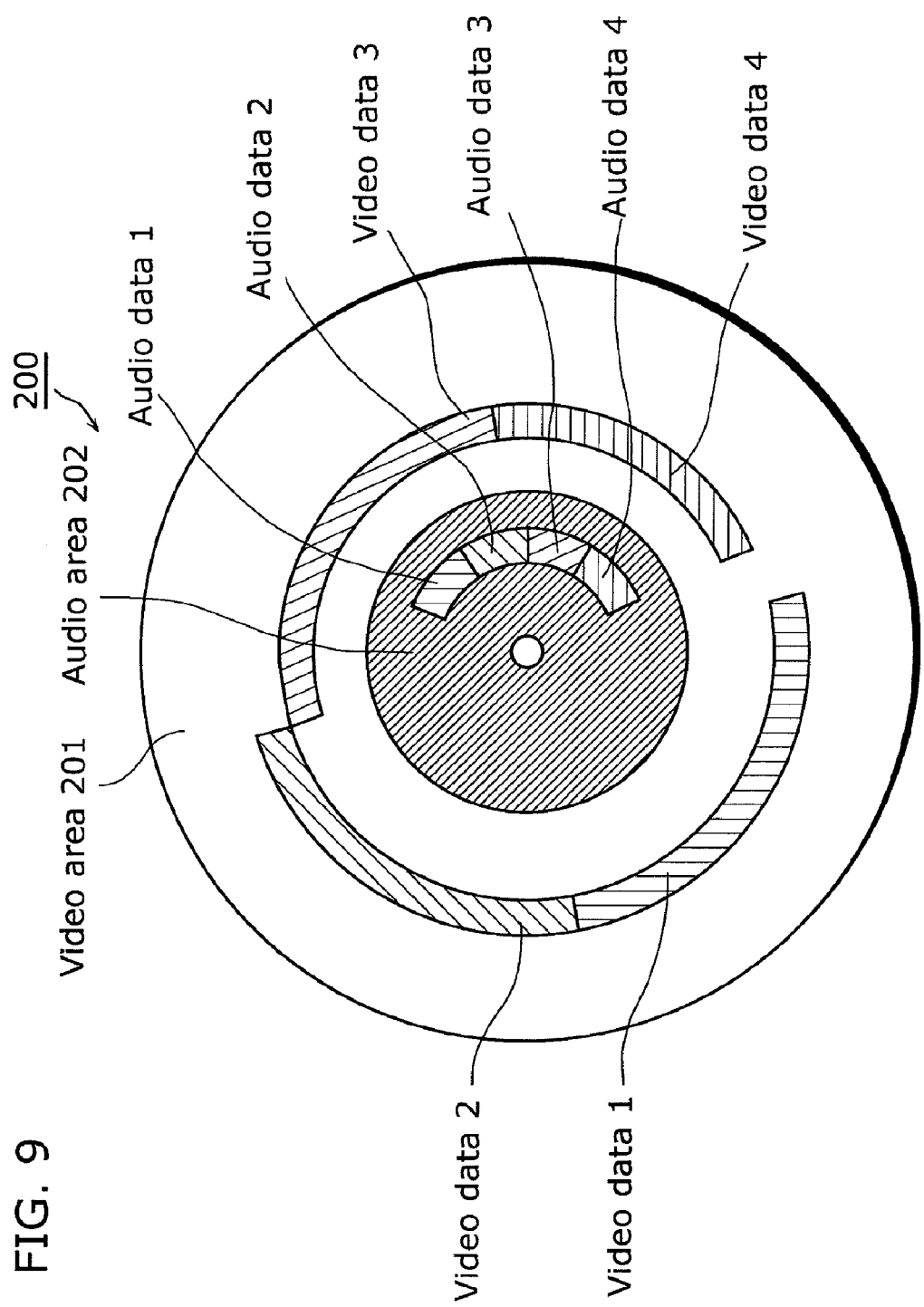
FIG. 9 illustrates positions of the video file and the audio file, to be recorded, provided in the HDD in the first embodiment of the present invention.

FIG. 9 illustrates positions of the video file and the audio file, to be recorded, provided in the HDD in the first embodiment of the present invention. Recorded in the HDDS 109 and 110, as shown in FIG. 9, are the video file and the audio file. The video file includes pieces of video data 1 to 4 which are successively recorded on the basis of a recording unit of the video file. The audio file includes pieces of audio data 1 to 4 which are successively recorded on the basis of a recording unit of the audio file.

When each of the video data 1 and the audio data 1 is sequentially reproduced with a use of two HDDS (HDDS 109 and 110), first, the video data 1 is read out of the HDD 109, and then the audio data 1 out of the HDD 110. Next, the video data 2 is read out of the HDD 109 again, followed by reading the audio data 2 out of the HDD 110. The rest of the pieces of data succeeding to the video data 1 and 2 and the audio data 1 and 2; namely video data 3 and 4 and audio data 3 and 4, are also read through a similar control. The HDD control unit 108 alternately transfers the pieces of the video data and the audio data, read through the above control, to the buffer memory for reproduction 107.

Even though the pieces of the video data 2 and the video data 3 are recorded on different tracks, however, the last LBA of the video data 2 and the beginning of the first LBA of the video data 3 are successively assigned. Hence, intermittently reading the video data 2 and the video data 3 causes no seek time, and it takes only the search time to read the video data 2 and the video data 3.

According to the above, reading the video data and the audio data out of different HDDS (HDDS 109 or 110) makes possible reducing the seek time in the access time. Assuming here that the read switching time between the HDDS 109 and 110 to be zero, the video data and the audio data is alternately outputted to output 502.

Illustrated here in FIG. 10A is a reproduction control with a use of two HDDS. FIG. 10A illustrates a reproducing method for performing normal reproduction using two of HDDS in the first embodiment of the present invention.

As shown in FIG. 1, the reproduced video data and the audio data is temporarily stored in the buffer memory for reproduction 107 and simultaneously read. Then, the video and the audio are provided via the decoder 117 and the audio processing unit 113, respectively. The reason why the data is temporarily stored in the buffer memory for reproduction 107 is because the pieces of video data and audio data to be sequentially read are to be properly timed to be provided. Temporarily storing the data also reduces time for data transfer due to a read error caused at an HDD (the HDD 109 or HDD 110), and reproduces the video and the audio free from interruption.

FIG. 10B illustrates a reproducing method for performing the normal reproduction using one of the HDDS in the first embodiment of the present invention.

When just a single HDD (the HDD 109 or the HDD 110) is used to reproduce the video data and the audio data, the pieces of the video data 1 to 4 and the audio data 1 to 4 shown in FIG. 9 need to be sequentially read out of the single HDD. In other words, a seek is necessary in switching the reading between the video data and the audio data. Thus, a seek time and a search time occur additionally when the single HDD (the HDD 109 or the HDD 110) reproduces the video data and the audio data.

It is noted that the processing including the output 502 or subsequent to the output 502 is similar to that performed on two HDDS (HDDS 109 and 110).

Here, assumed are transfer rates in normal reproduction to be Rpb1 and Rpb2 with a use of the two HDDS and the single HDD, respectively. The transfer rates are calculated out of the following expressions:

$$Rpb1 = (Dv + Da)/((Tv + Tsh) + (Ta + Tsh))$$

$$Rpb2 = (Dv + Da)/((Tv + Ts + Tsh) + (Ta + Ts + Tsh))$$

Dv=Video data recording unit (Byte)
Da=Audio data recording unit (Byte)
Tv=Dv read time (sec)
Ta=Da read time (sec)
Ts=Seek time (sec)
Tsh=Search time (sec)

Via the above expressions, the two HDDS (HDDS 109 and 110) are used to control reproduction of each of the video data and the audio data out of a different HDD, which reduces the seek time (Ts). This makes possible improving the transfer rate further than that through the control on a single HDD.

The improving transfer rate leads to the reduction of the time to accumulate a predetermined amount of data in the buffer memory for reproduction 107, and cuts down the time required to properly time between the video data and the audio data. In other words, time can be reduced between the control start of the normal reproduction and the actual output of the video and the audio. This improves operational responsiveness (response). Further, even in the case where an interruption occurs in reading from an HDD due to a read error, the time to fulfill the data in the buffer memory for reproduction 107 has been reduced. Hence, the fulfillment of the data in the buffer memory for reproduction 107 in the short period of time can improve an error tolerance.

In other words, this enables the reproduction performance of the video data and the audio data to be improved while minimizing the number of the disk devices to two.

Described next is a reproduction control in reproduction in special mode. The reproduction in special mode, including high-speed reproduction and slow reproduction which come with audio, is used to find an editing point in editing. The video is as fast as 30 frames per second (25 frames in the 1080/50i system). Thus, in order to achieve the speed of 30 frames per second, the video frames are discretely reproduced in the high-speed reproduction, and on the contrary, the video frames are overlapped in the slow reproduction.

Meanwhile, the discrete reproduction of audio in the high-speed reproduction causes noise at a discontinuous point in the audio data. In order to provide noiseless audio, for example, the audio data is read twice as fast as a regular rate in double-speed reproduction, filtered by the audio processing unit 113 to be converted to the regular rate, and then outputted from the audio output unit 112 as the noiseless audio.

When providing noiseless audio in the slow reproduction, as well, the audio data is read half as fast as a regular read rate in half-speed reproduction, filtered by audio processing unit 113 to be converted to the regular rate, and then outputted from the audio output unit 112.

FIG. 11A illustrates a reproducing method for performing reproduction in special mode using two of the HDDS in the first embodiment of the present invention.

FIG. 11A shows timing in performing the double-speed reproduction, using two HDDS (HDDS 109 and 110). The following is a method for reading the successively recorded pieces of video data 1 to 4 and the audio data 1 to 4 as shown in FIG. 9.

When video data 1 is read from the HDD 109, video data one frame is read for every two frames as follows: video data is read for one frame; succeeding video data is skipped for one frame; and video data following the skipped video data is read for one frame. Hence, every reading of the video data for one frame develops a search time. The read video data is temporarily stored in the buffer memory for reproduction 107.

It is noted that the pieces of video data are continuously read on a recording unit basis in the normal reproduction. In the double-speed reproduction, meanwhile, one frame is read for every two frames so that a half of the data amount is read out of one recording unit. However, the amount of data needed for reproduction is as large as the data amount required for the normal reproduction. Thus, the video data is read, per reading, out of an interval twice as great as the recording units for the pieces of video data 1 and 2.

On the other hand, all the pieces of the audio data 1 to 4 need to be read. Thus, the successively arranged pieces of the audio data 1 and 2 are continuously read out of the HDD 110. This causes no seek time or search time. The read audio data is also temporarily stored in the buffer memory for reproduction 107.

As shown in FIG. 1, as well, the reproduced video data and the audio data is temporarily stored in the buffer memory for reproduction 107, and then simultaneously read. The read video data is provided via the decoder 117, and the read audio data via the audio processing unit 113. Here, the pieces of video data are continuously read as are read in the normal reproduction. Thus, the pieces of video data for one frame are read out of the HDD (the HDD 109 or the HDD 110) for every two frames so that the video to be provided is reproduced every other frame; namely, the double-speed reproduction.

Moreover, the audio data is read out of the buffer memory for reproduction 107 twice as fast as in the normal reproduction, decimated to a half in size and properly filtered by the audio processing unit 113, and outputted. This allows the audio to be outputted twice as fast as in the normal reproduction free from interruption. The reason why the pieces of video data and audio data are temporarily stored in the buffer memory for reproduction 107 is because the pieces of video data and audio data to be sequentially read are to be properly timed to be provided. Temporarily storing the pieces of data also addresses the problem of taking extra time for data transfer due to a read error caused at an HDD (the HDD 109 or HDD 110), and reproduces the video and the audio free from interruption.

FIG. 11B illustrates a reproducing method for performing reproduction in special mode using one of the HDDS in the first embodiment of the present invention.

When just a single HDD (the HDD 109 or the HDD 110) is used to reproduce the video data and the audio data at a double speed, the pieces of the video data 1 to 4 and the audio data 1 to 4 shown in FIG. 9 need to be sequentially read out of the single HDD. The reading order in the double-speed reproduction is similar to the order with two HDDS; however, a seek is necessary in switching the reading between the video data and the audio data. Thus, a seek time and a search time occur when only the single HDD (the HDD 109 or the HDD 110) reproduces the video data and the audio data.

It is noted that the processing including the output 502 or subsequent to the output 502 is similar to that performed on two HDDS (HDDS 109 and 110).

Moreover, all of the video data in FIG. 11 is read on a frame basis for a reproduction control to read data for one frame for every two frames.

Here, assumed are transfer rates, of the output 502, in the double-speed reproduction to be Rpb 3 and Rpb2 with a use of the two HDDS in FIG. 11A and the single HDD in FIG. 11B, respectively. The transfer rates are calculated out of the following expressions:

$$Rpb\ 3 = (F \times Dvf + N \times Da)/(F \times (Tvf + Tsh) + (N \times Ta + Tsh))$$

$$Rpb\ 4 = (F \times Dvf + N \times Da)/((F \times (Tvf + Tsh) + Tsva) + (N \times Ta + Tsh + Tsva))$$

F=The number of video frames for video data to be read per transfer
Dvf=Video data for one frame (Byte)
N=Reproduction speed
Da=Audio data recording unit (Byte)
Tvf=Dvf read time (sec)
Ta=Da read time (sec)
Tsva=Seek time between video data and audio data (sec)
Tsh=Search time (sec)

According to FIG. 11 and the above expressions, the use of two HDDS (the HDD 109 and the HDD 110) in the double-speed reproduction makes possible all the reading of the video data and the audio data only within the search time at Rpb 3. Meanwhile, the use of only a single HDD (the HDD 109 or the HDD 110) in the double-speed reproduction causes the seek time (Tsva) when switching the reading between the video data and the audio data at Rpb 4. This causes the transfer rate to be deteriorated.

Even in the high-speed or the slow reproduction, the above shows that the transfer rate Rpb 3 that employs a control method in using two HDDS for reproduction, overcomes the transfer rate Rbp 4 that employs a control method in using a single HDD for reproduction. This makes possible improving responsiveness and error tolerance in the high-speed or the slow reproduction, as well as in the normal reproduction. In other words, this enables the protection of the recorded data, and the improvement in the reproduction performance of the video data and the audio data while minimizing the number of the disk devices to two.

Described last is a reproduction control in a cut edit.

Video editing is to clip necessary portions out of several materials, such as a video file and an audio file, on a video frame basis (referred to as clipping out of a material, hereinafter), and to rearrange the portions clipped on the video frame basis at the editor's own choice. When the edit is finalized, usually carried out is work called rendering in order to put editing results, including the several materials, together into a pair of video data and audio data, and to output the pair. The video editing in the first embodiment requires changing clipping positions of the materials and an order rearrangement of the materials. Thus, the clipping positions of the materials and the order rearrangement of the materials are stored in a reproduction procedure called an editing list. Then, according to the stored reproduction procedure in the editing list, predetermined portions are read out of the several material files in a predetermined order. This reproduction control is referred to as the cut edit. In each of the materials, the start and the end of a clipping position are respectively referred to as an IN point and an OUT point. Setting the IN and OUT points at the editor's own choice makes possible clipping the material at any given time; namely, performing the cut edit.

FIGS. 12A to 12D illustrate the cut edit.

FIG. 12A illustrates an extracting method for extracting data from a video file 1 and an audio file 2 in a cut edit in the first embodiment of the present invention. FIG. 12B illustrates a clipping method for extracting data from a video file 2 and the audio file 2 in the cut edit in the first embodiment of the present invention.

FIG. 12C shows an edit list determining a reproducing order of the pieces of data clipped in the cut edit in the first embodiment of the present invention. FIG. 12D shows a reproducing order of the pieces of data clipped from the edit list in the cut edit in the first embodiment of the present invention.

As shown in FIG. 12A, first set are the IN and OUT points at predetermined portions in the video file 1 and the audio file 1. Next extracted are pieces of: video data V1 positioned between the IN and OUT points set at the predetermined positions in the video file 1; and audio data A1 (Ch 0) through audio data A1 (Ch 7) positioned between the IN and OUT points set in the predetermined portions in the audio file 1.

As shown in FIG. 12B, as well, first set are the IN and OUT points at predetermined portions in the video file 2 and the audio file 2. Next, extracted are pieces of: video data V2 positioned between the IN and OUT points set at the predetermined positions in the video file 2; and audio data A2 (Ch 0) through audio data A2 (Ch 7) positioned between the IN and OUT points set in the predetermined portions in the audio file 2.

Here, as shown in FIG. 12C, the edit list is created so that the pieces of the video data V1 and the audio data A1 (Ch 0) through the audio data A1 (Ch 7) are reproduced, followed by reproduction of the pieces of the video data V2 and the audio data A2 (Ch 0) through the audio data A2 (Ch 7). The created edit list enables continuous reproduction of the clipped pieces of the video data V1 and V2 and the pieces of the audio data A1 and A2 as shown in FIGS. 12A and 12B, respectively.

Figure 13:
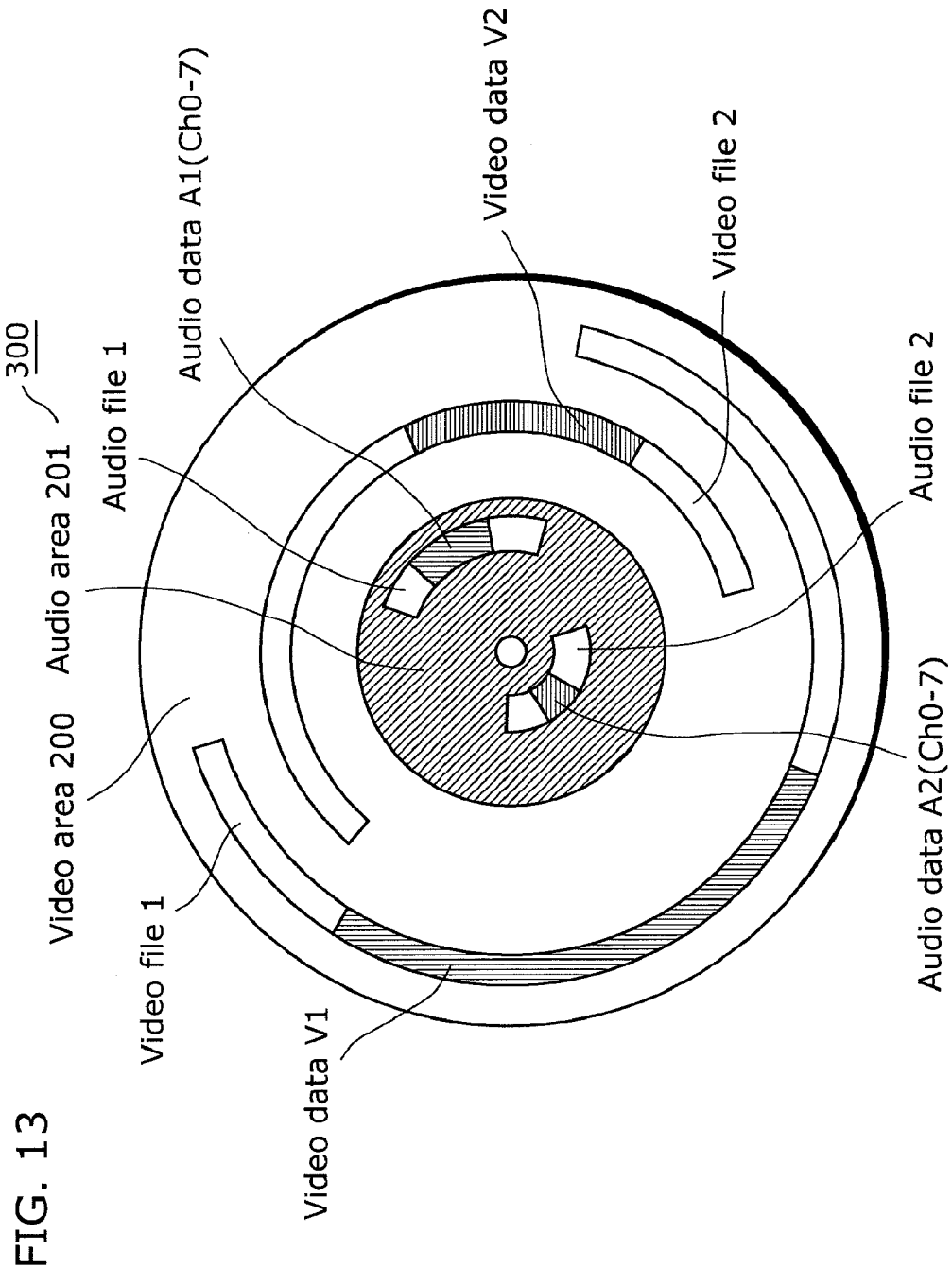
FIG. 13 illustrates positions of the video file and the audio file provided on the HDD in the cut edit in the first embodiment of the present invention.

FIG. 13 illustrates recording positions of the video file and the audio file provided on the HDD in the cut edit in the first embodiment of the present invention.

Assume that the pieces of the video data V1 and the audio data A1 (Ch 0) through the audio data A1 (Ch 7) to be extracted and the pieces of the video data V2 and the audio data A2 (Ch 0) through the audio data A2 (Ch 7) to be extracted are respectively recorded in the HDDS 109 and 110 as shown in FIG. 13, for example. Here, when the pieces of the data are reproduced with a use of two HDDS (the HDDS 109 and 110) according to the reproduction procedure of the edit list shown in FIG. 12C, a seek time occurs since the pieces of the data never fail to discontinue on the magnetic disks in the HDDS at the switching points of the video data and the audio data shown in FIG. 12D. Moreover, the IN and OUT points are set at the editor's own choice in the cut edit. Thus, continuous reproduction, by the cut edit, of pieces of data having a small number of video frames leads to frequent occurrence of seeks within a certain period, which causes degradation in a transfer rate.

Here, the number of video frames from the IN to the OUT points in the cut edit is defined as a cut length Cn. A predetermined size of the cut length Cn corresponds to a continuously-reproducible data size in an edit of the video data or the audio data in the present invention. A cut length ensuring seamless reproduction, which does not cause the transfer rate degradation, can be calculated as a shortest cut length Cn_min which is no smaller than a reproduction rate of a video format and an audio format. The shortest cut length Cn_min can be obtained, using the transfer rate calculated with the expressions described hereinafter. Here, assume that all pieces of data to be reproduced according to the edit list are in the same cut length Cn.

In the reproduction of the cut edit, seamless reproduction is ensured in the case where the length of each of materials is longer than the shortest cut length Cn_min, the material which is positioned between the IN and OUT points set at the predetermined portions of the video file and the audio file. In editing the materials with a use of a shorter unit than the shortest cut length Cn_min, the materials are rearranged (partial rendering) in successive areas on the HDD. Here, the rearranged materials include materials positioned before and after each of the materials which is positioned between the IN and OUT points set in the predetermined portions of the video and the audio files. This can meet the length of each of the materials to be shorter than the shortest cut length Cn_min, which makes seamless reproduction possible.

It is noted that the clipping pattern according to the settings of the IN and OUT points in FIG. 12 possibly includes several clipping patterns, such as the case where all pieces of data to be reproduced (hereinafter referred to as valid data) are stored within a recording unit of the video file and a recording unit of the audio file and the case where pieces of the valid data extend over several recording units of the video and audio files.

Figure 14:
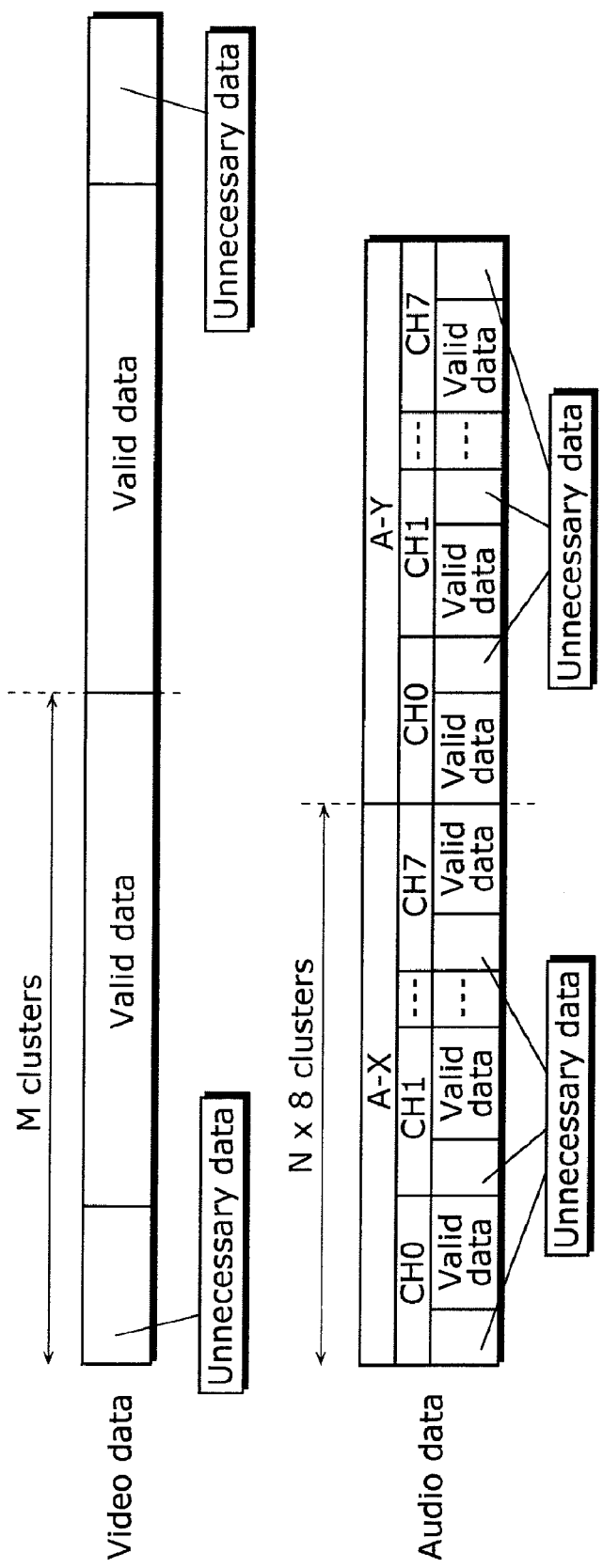
FIG. 14 illustrates a valid data recording position when pieces of valid data extend over two file recording units in the cut edit in the first embodiment of the present invention.

FIG. 14 illustrates a valid data recording position when pieces of valid data extend over two file recording units in the cut edit in the first embodiment of the present invention. Assumed here is a model to obtain expressions for calculating a transfer rate when both pieces of the video data and the audio data extend over two recording units as shown in FIG. 14. Further, the video and the audio files are successively recorded in respective regions, as shown in FIG. 13. Thus, only the cut length to be reproduced (valid data) is read out of the video data shown in FIG. 14.

When only the valid data of each of channels is read in the audio data, switching between each of the channels causes a search time. In the case of N=4, for example, the data read time can be reduced by: reading at one time A-X (32 clusters) and A-Y (32 clusters) including unnecessary data; and, for example, clipping only a portion of valid data with a use of reproducing control unit 104, instead of reading only the valid data of each channels in the audio data. Considering the above, the read unit of the audio data is assumed to be 2×N×8 clusters including the valid data and the unnecessary data.

FIG. 15A illustrates a reproducing method for performing a cut edit, using two of the HDDS in the first embodiment of the present invention. FIG. 15A shows a reproduction control with a use of the two HDDS (the HDDS 109 and 110) in reproduction of the cut edit illustrated in FIG. 12D.

First, the video data V1; namely the valid data, is read out of the HDD 109. Then, two of recording units; namely pieces of audio data A1-X and A1-Y, are read at one time out of the HDD 110. Here, the audio data A1-X and the audio data A1-Y includes the valid data and invalid data. Upon finishing the reading of the audio data, the video data V2; namely the valid data, is read out of the HDD 109 again, followed by reading of audio data A2-X and audio data A2-X out of the HDD 110 as the reading of audio data A1.

FIG. 15B illustrates a reproducing method for performing a cut edit, using one of the HDDS in the first embodiment of the present invention. FIG. 15B shows a reproduction control with a use of the HDD (the HDD 109 or the HDD 110). The HDD handles the same amount of the data and reads the pieces of the data in the same order as the two HDDS (the HDDS 109 and 110) handle. Here is the difference of reproduction controls between two HDDS and a single HDD. In FIG. 15A, the seek time occurs between the pieces of the video data, and between the pieces of the audio data, such as between the video data V1 and the video data V2, and the audio data A1-Y and the audio data A2-X, for example. Meanwhile, in FIG. 15B, the seek time occurs between the pieces of the video data and the audio data, such as between the video data V1 and the audio data A1-X and between the audio data A1-Y and the video data V2.

Here, assumed are transfer rates of the reproduction control in the cut edit to be Rpb 5 and Rpb 6 with a use of the two HDDS and the single HDD, respectively. The transfer rates are calculated out of the following expressions:

$$Rpb\ 5 = (Cn \times Dvf + Dap)/((Cn \times Tvf + Tsv + Tsh) + (2 \times Ta + Tsa + Tsh))$$

$$Rpb\ 6 = (Cn \times Dvf + Dap)/((Cn \times Tvf + Tsva + Tsh) + (2 \times Ta + Tsva + Tsh))$$

Cn=Cut length (Frame)
Dvf=Video data for one frame (Byte)
Dap=Amount of valid audio data (Byte)
Tvf=Dvf read time (sec)

Ta=Read time of audio data for recording unit (sec)
Tsv=Seek time between pieces of video data (sec)
Tsa=Seek time between pieces of audio data (sec)
Tsva=Seek time between video data and audio data (sec)
Tsh=Search time (sec)

The seek occurring at the transfer rate Rpb 5 with a use of the two HDDS, that is the seek occurring between the pieces of the video data (Tsv) and between the pieces of the audio data (Tsa), is typically shorter in seek time than the seek occurring at the transfer rate Rpb 6 with a use of the single HDD, that is the seek occurring between the video data and the audio data (Tsva). Hence, when the transfer rate Rpb 5 with the two HDDS is compared with the transfer rate Rpb 6 with the single HDD as the same transfer rate, the transfer rate Rpb 5 with the two HDDS can reduce the cut length Cn. This makes possible improving edit performance in the cut edit. Moreover, when the cut length Cn of the transfer rate Rpb 5 with the two HDDS is compared with the cut length Cn of the transfer rate Rpb 6 with the single HDD as having the same number of frames, the transfer rate Rpb 5 with the two HDDS is higher in transfer rate. This enables: an accumulation speed of data in the buffer memory for reproduction 107 to increase; and responsiveness from an instruction sent by the external input unit 118 to reproduction start to be enhanced in speed. This allows the reproduction and edit performance of the video data and the audio data to be improved while minimizing the number of the disk devices to two.

Figure 15:
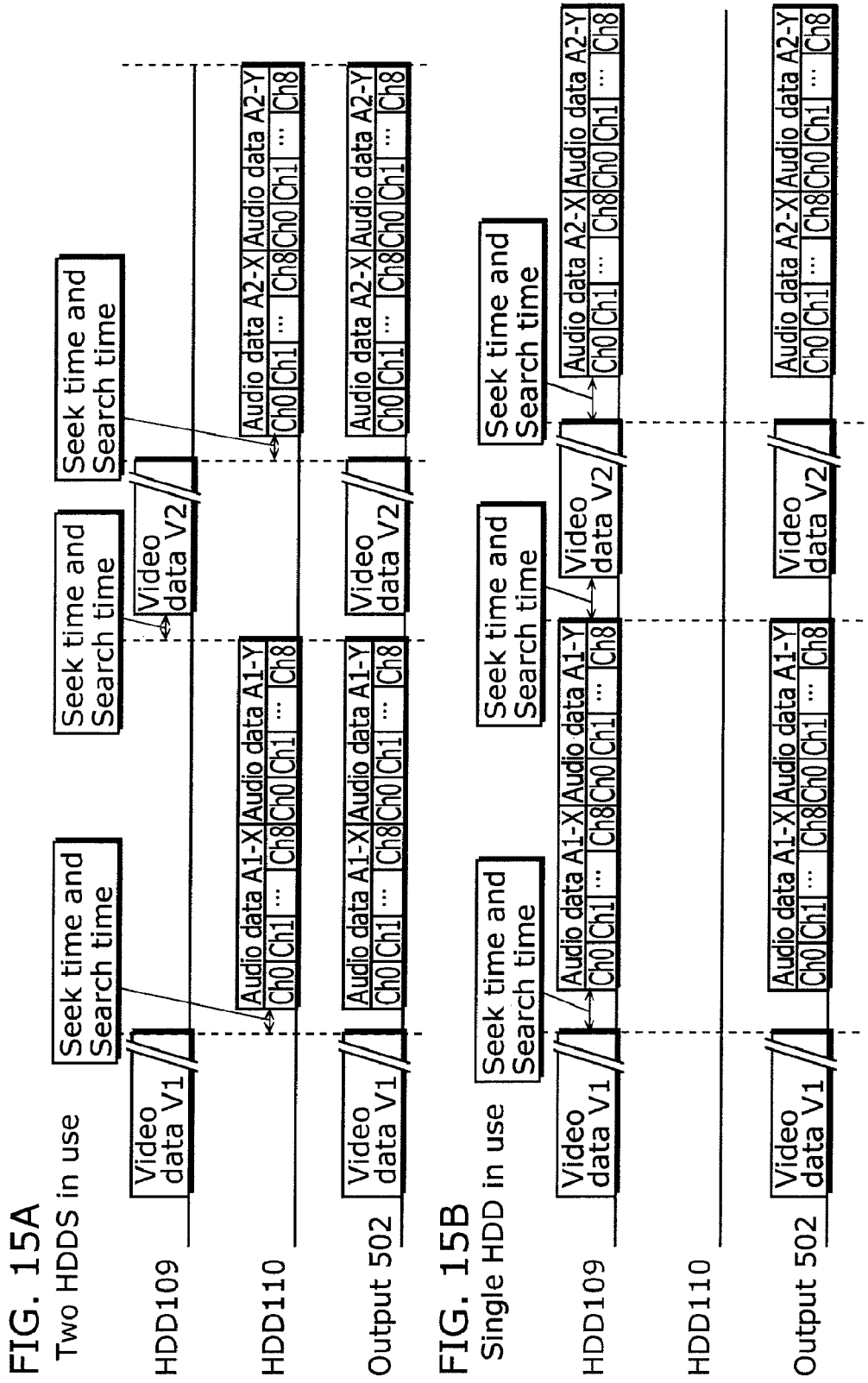
FIG. 15A illustrates a reproducing method for performing a cut edit, using two of the HDDS in the first embodiment of the present invention.
FIG. 15B illustrates a reproducing method for performing a cut edit, using one of the HDDS in the first embodiment of the present invention.
Figure 16:
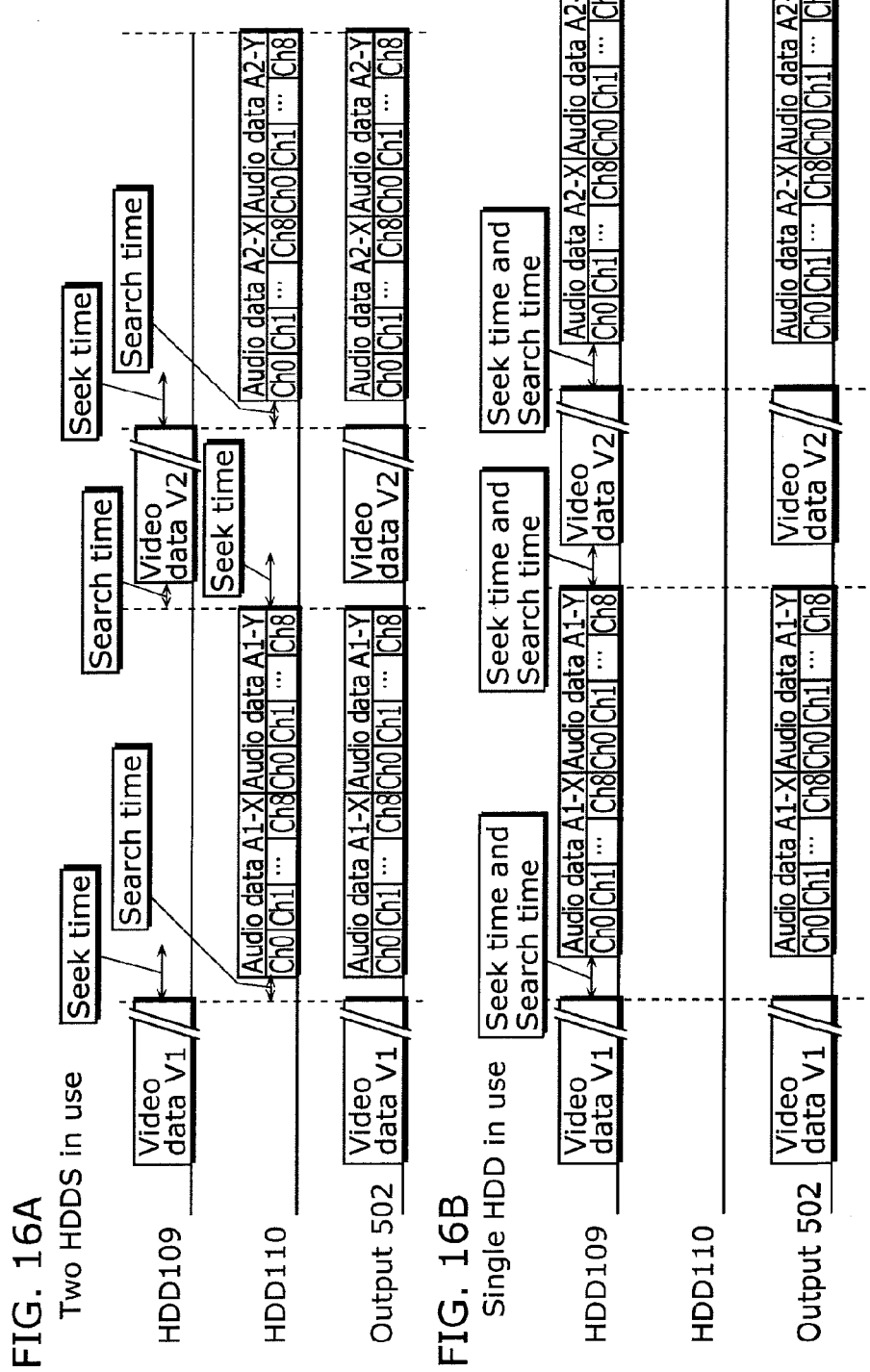
FIGS. 16A and 16B illustrate a reproducing method for performing a cut edit using two of the HDDS in a modification of the first embodiment of the present invention.

FIG. 15A shows an occurrence of a seek between the pieces of the video data (Tsv) and between the pieces of the audio data (Tsa). Here, making the seek immediately before reading the pieces of the video data and audio data makes possible sharing a data-reading algorithm between the case where the two HDDS (the HDDS 109 and 110) are used and the case where only the single HDD (the HDD 109 or the HDD 110) is used. However, the seek time takes up to greater than 10 ms while the search time takes as short as several ms. For achieving further high-speed responsiveness, the seek time shown in FIG. 15A needs to be reduced. A modification of FIG. 15 to achieve the above shall be described with reference to FIG. 16.

FIG. 16A illustrates a reproducing method for performing a cut edit, using two of the HDDS in a modification of the first embodiment of the present invention. FIG. 16B illustrates a reproducing method for performing a cut edit, using one of the HDDS in the first embodiment of the present invention. It is noted that FIG. 16B is shown for the sake of comparison with FIG. 16A. Meanwhile, both of FIG. 16B and FIG. 15B are exactly the same and share completely the same control method, and thus details of the operations shall be omitted.

A big difference between FIGS. 15A and 16A is the timing of the seek made between the pieces of the video data and between the pieces of the audio data. FIG. 15A shows the seek made immediately before the reading of each data. Meanwhile, FIG. 16A shows the seek made between the pieces of the video data during a read of the audio data, and the seek made between the pieces of the audio data during a read of the video data. This reproduction method in FIG. 16A conceals the seek time. Specifically, FIG. 16A shows that the header of the HDD 109 makes the seek to a read start position of the video data V2 while the pieces of audio data A1-X and the audio data A1-Y are being read, which ends the seek by the start of reading the video data V2. This enables the switching from the pieces of the audio data A1-Y to the video data V2 to be performed only in the search time. Thus, the reproducing method in FIG. 16A can achieve a further enhancement in speed than that in FIG. 15A due to the reduction of the seek time out of a non-transfer interval of data.

Specifically described hereinafter is the reproducing method in FIG. 16A, including a timing of the seek occurring between the pieces of the video data and between the pieces of the audio data.

First, the video data V1; namely the valid data, is read out of the HDD 109.

Next, in the HDD 109, made is a seek to the video data V2; namely the next valid data. At the same time, read out of the HDD110 at one time are the two recording units; namely, the audio data A1-X and the audio data A1-Y each including the valid data and the invalid data. It is noted that the seek between the pieces of the video data (between the video data V1 and the video data V2); namely the valid data, ends while the two recording units are being read at one time out of the HDD 110, the two recording units which are the audio data A1-X and the audio data A1-Y each including the valid data and the invalid data.

Then, upon reading the audio data out of the HDD 110, a seek is made to the audio data A2-X; namely, the next valid data. At the same time, the video data V2; namely the valid data, is read out of the HDD 109 again. It is noted that the seek between the pieces of the audio data (between the audio data A1-Y and the audio data A2-X) ends while the video data V2; namely the valid data, is being read out of the HDD 109.

Next, upon reading the video data V2; namely the valid data, out of the HDD 109, a seek is made to the video data V3; namely, the next valid data. Meanwhile, read at one time out of the HDD 110 are the two recording units; namely the pieces of the audio data A2-X and A2-Y each including the valid data and the invalid data. It is noted that the seek between the pieces of the video data (between the video data V2 and the video data V3); namely the valid data, ends while two of the recording units; namely the audio data A2-X and A2-Y each including the valid data and the invalid data, are being read out at one time.

The above has described that the header of the HDD 109 makes the seek to a read start position of the video data while the audio data is being read in the HDD 110 so that the seek ends by the start of the read of the video data, which reduces the seek time in a non-transfer period of the video data. This enables the switching from the audio data to the video data to be performed only in the search time. Similarly, the header of the HDD 110 makes the seek to a read start position of the audio data while the video data is being read in the HDD 109 so that the seek ends by the start of the read of the audio data, which reduces the seek time in a non-transfer period of the audio data. This enables the switching from the video data to the audio data to be performed only in the search time. Compared with the recording method in FIG. 15A, this allows the recording method in FIG. 16A to achieve enhancement in speed due to reduction of the seek time in a non-transfer period in data.

Described above are the cases where the two HDDS (the HDDS 109 and 110) are used and only the single HDD (the HDD 109 or the HDD 110) is used.

Described next are details of the switching between uses of the two HDDS and the single HDD (switching between the numbers of the HDDS).

The two HDDS are used for reproduction in the case where neither of the HDDS (the HDDS 109 and 110) suffers a breakdown nor a timeout error. The reproduction control with a use of the two HDDS can improve a transfer rate in any of the normal reproduction, the reproduction in special mode, and the cut edit described above. This makes possible improving performance of the device, such as enhancement in responsiveness and improvement in error tolerance.

When one of the HDDS suffers a breakdown or a timeout error, the other normal one is used for reproduction.

The transfer rate with a use of a single HDD in the normal reproduction is Rpb 2 as described above. Compared with the transfer rate Rpb 1 with a use of two HDDS, Rpb2 causes degradation in responsiveness and error tolerance. Still, Rpb 2 is capable of performing reproduction. Moreover, the transfer rate Rpb 2 with the single HDD and the record guarantee rate Rrec in the recording are equivalent, which shows that the normal reproduction with the single HDD is also possible in the case where mirroring on the two HDDS is possible.

The transfer rate with a single HDD in the reproduction in special mode is Rpb 4 as described above. In the case where the transfer rate Rpb 4 with the single HDD is below the reproduction rate of the video format and the audio format, the same reproduction control as that with the two HDDS leads to underflow of the buffer memory for reproduction 107 in reproducing the video file and the audio file. This possibly causes a disconnection of the video or noise in the audio.

Hence, the video reproduction rate which shares most of the required reproduction rate is adjusted down to the level at which the transfer rate Rpb 4 with the single HDD can also handle the reproduction. This enables the single HDD to perform reproduction. The adjustment of the reproduction rate is carried out by reducing the number of video frames to be updated per second (time lapsing). The National Television System Committee (NTSC) defines, for example, that 30 frames per second (25 frames for the Phase Alternation by Line (PAL)) are typically required to be updated. Assuming that the time lapsing involves reading the video data, with 15 frames per second updated, out of the single HDD (the HDD 109 or the HDD 110), the read rate required of the single HDD (the HDD 109 or the HDD 110) is reduced to a half.

It is noted that a missing frame in the above reproduction can be complemented by re-reproducing the video frame which the reproducing control unit 104 has already reproduced.

Here, the number of video frames updated per second is equivalent to a video frame update cycle in the present invention. The NTSC defines, for example, that a first reproduction condition typically involves updating 30 frames per second (25 frames for PAL), and a second reproduction condition 15 frames per second.

According to the expression obtaining the transfer rate Rpb 6 with a use of the above single HDD, the parameter affecting the transfer rate in the cut edit is cut length Cn. Thus, the shortest cut length Cn_min for the single HDD may be designed to be greater than the operation time of the two HDDS so that the single HDD can handle the reproduction in the cut edit. Even in the case of a seamless-reproducible edit list with the two HDDS, for example, the seamless reproduction is possible by rendering to rearrange only a portion which fails to comply with the shortest cut length Cn_min with the single HDD.

Described next is an error operation in reproduction. Typical errors are twofold: a "timeout error" which causes temporal unresponsiveness to a Read instruction; and a "breakdown" caused by a total down of the HDD or by the result of frequent timeout errors.

Here, the "timeout error" refers to the case where a reply to a Read instruction cannot be received by a predetermined time-out period.

A timeout error treatment shall be described hereinafter with reference to FIG. 17.

Figure 17:
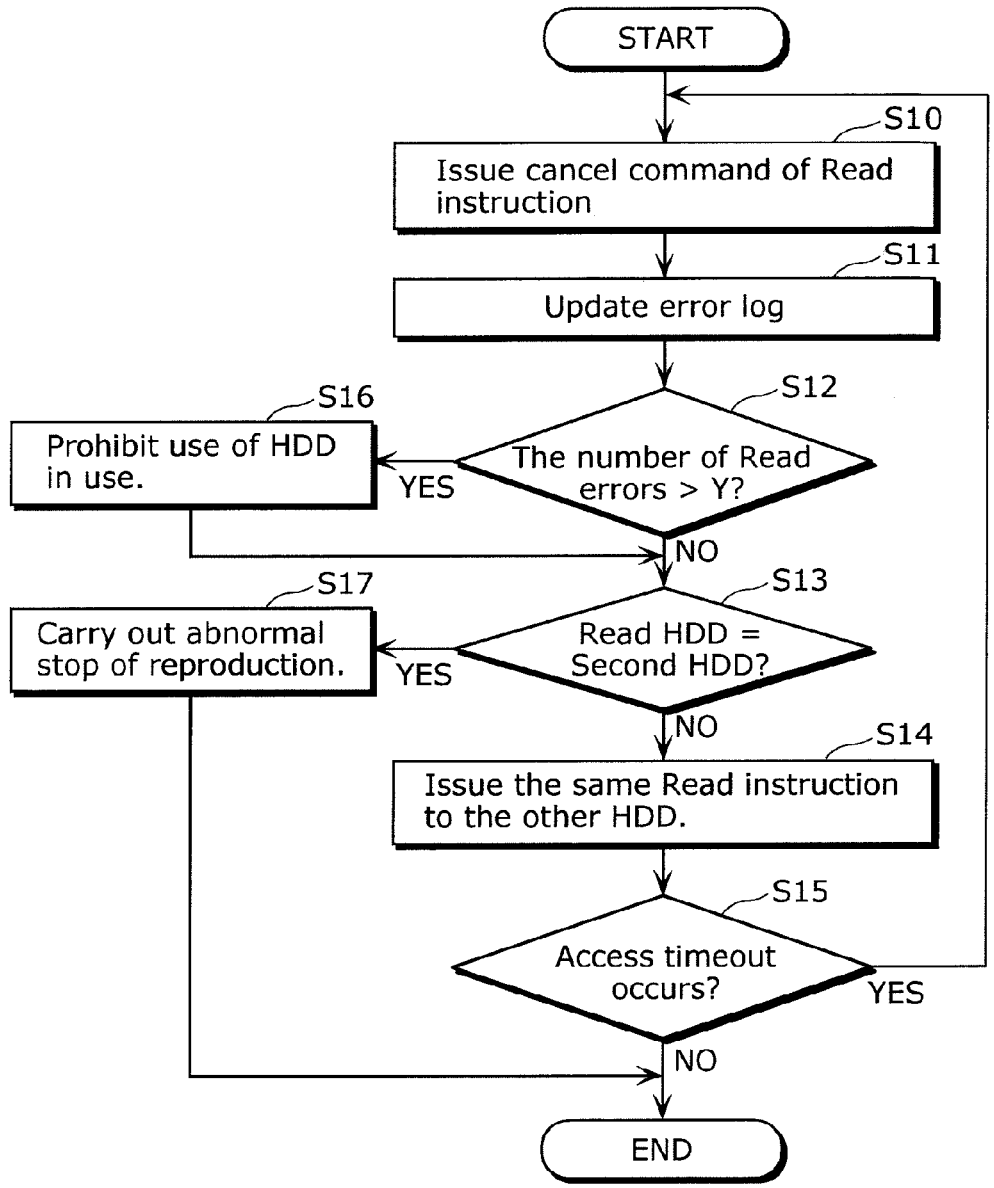
FIG. 17 is a flowchart showing error treatment in the reading in the first embodiment of the present invention.

FIG. 17 is a flowchart showing error treatment in the reading in the first embodiment of the present invention.

First, when a timeout error develops, the HDD control unit 108 issues to the HDD having the timeout error (either one of the HDD 109 or the HDD 110) a cancel command of the Read instruction (S10).

Next, the HDD control unit 108 updates an error log (S11).

Then, the HDD control unit 108 checks whether or not the number of Read timeout errors developed in the target HDD having the timeout error (the HDD 109 or the HDD 110) exceeds more than Y times (S12).

In the case where the number of the Read timeout errors of the target HDD (one of the HDD 109 and the HDD 110) has not exceeded Y times (S12: NO), the HDD control unit 108 determines that the other HDD (the other one of HDD 109 and HDD 110) is available for reading (S13: NO), and issues the same Read instruction to the other HDD (the other one of HDD 109 and HDD 110) (S14).

In the case where the number of the Read timeout errors of the target HDD (one of the HDD 109 and the HDD 110) has exceeded Y times (S12: YES), the HDD control unit 108 determines that the target HDD (one of the HDD 109 and the HDD 110) has developed a breakdown, and prohibits the use of the target HDD (S16).

Then, in the case where no access timeout occurs at the second HDD; that is, the other HDD (the other one of the HDD 109 and the HDD 110) (S15: NO), the access timeout error treatment ends and the normal reproduction resumes.

In the case where the access timeout occurs at the second HDD; that is, the other HDD (the other one of the HDD 109 and the HDD 110) (S15: YES), the data cannot be read out of either HDD. Thus, the HDD control unit 108 controls the second HDD as has controlled the first HDD, such as issuing the cancel command of the Read instruction (S10), updating the error log (S11), and checking the number of the Read timeout errors (S12).

Next, the HDD control unit 108 carries out an abnormal stop processing (S17). Here, the abnormal stop, determined by the HDD control unit 108 development of a breakdown on the second HDD, is to prohibit the use of the second HDD in the case where even the second HDD suffers more than Y times of the Read timeout errors in the check of the number of the Read timeout errors (S12).

It is noted that the time period, up to when the HDD control unit 108 determines the occurrence of the Read timeout error, needs to be set as a time in which the reproduction buffer memory 107 does not become empty. For example, the moment memory of the buffer memory for reproduction 107 is occupied more than half, the reproducing control unit 104 controls the buffer memory for reproduction 107 to start providing the data to the audio processing unit 113 and the decoder 117. The HDD control unit 108 determines that the timeout error has occurred when the amount of data accumulated in the buffer memory for reproduction 107 goes below one fourth of the available memory.

When determining that the timeout error has occurred, the HDD control unit 108 temporarily switches the reproduction control with the two HDDS to that with the single HDD in order to make possible continuing the operation.

Here, the "breakdown" refers to the cases where: the number of the Read timeout errors exceeds a threshold value in the check of the number of the Read timeout errors in S12 shown in FIG. 17; and an access to the HDD is denied due to a life of the HDD.

Described above has been how to deal with the breakdown. Described below is how to reduce the number of breakdowns per se.

The reproduction control with a use of the two HDDS (the HDDS 109 and 110) involves assigning most of the storage areas 200 in the HDDS to the areas 201 for the video data. This creates serious mechanical overload for the HDDS reading the video data.

Hence, the video recording and reproducing apparatus 100 may include one of (i) a switching unit which switches between a first disk device and a second disk device for every power-on of the video recording and reproducing apparatus, switched one of the first disk device and the second disk device which is designated as a disk device out of which said reading unit reads the video data; and (ii) a switching unit which switches between the first disk device and the second disk device for every predetermined numbers of reproduction times by the video recording and reproducing apparatus, switched one of the first disk device and the second disk device which is designated as a disk device out of which said reading unit reads the video data. Moreover, the video recording and reproducing apparatus 100 may include (i) a number of errors detecting unit which counts the number of errors representing the number of failures of reading out of the first disk device and the second disk device, and (ii) a selecting unit which selects either the first disk device or the second disk device, whichever has the smaller number of errors.

The video recording and reproducing apparatus 100 can switch the HDDS, from which the video data and the audio data is read, between the HDD 109 and the HDD 110 (i) every time the video recording and reproducing apparatus 100 activates; that is every power-on of the video recording and reproducing apparatus 100, (ii) every time the external input unit 118 requests the video recording and reproducing apparatus 100 for reproduction, and (iii) at a certain counter period (for every predetermined numbers of reproduction) by counting the number of reproduction requests. Thus, in a long run, the video recording and reproducing apparatus 100 can level mechanical overload of the HDD reading the video data, which makes possible extending the life of the HDDS 109 and 110.

Moreover, the video recording and reproducing apparatus 100 may perform reproduction control which involves (i) monitoring the number of errors representing the number of failures in reading and reproducing when reading out of the HDDS 109 and 110, (ii) selecting an HDD having a fewer errors (the HDD 109 or the HDD 110), and (iii) reproducing the video data.

Described above have been the recording control and the reproduction control. Next described is a process described in FIG. 17 in recording and reproducing; that is a notification method to the user when the breakdown of the HDD has been determined with a use of the algorithm. The notification to the user is carried out by the displaying unit 119.

FIGS. 18A to 18E exemplify operational status of two of the HDDS in the first embodiment of the present invention.

Displayed in FIG. 18A is the operational status of the two HDDS (the HDDS 109 and 110) under a normal operation. Displayed in FIG. 18B is the breakdown of the HDD 110 out of the two HDDS. In the case where FIG. 18B is displayed, the recording of the video data and the audio data is possible with a use of a single HDD (the HDD 109). However, the reproduction with a use of the single HDD (the HDD 109) may not be possible since the reproduction depends on the video format. Displayed in FIG. 18C is the operational status in which the reproduction using the single HDD (the HDD 109) is not possible.

In the case where both of the two HDDS (the HDDS 109 and 110) are determined to be broken down, the operational status is displayed as FIG. 18D shows, and thus neither of the two HDDS (the HDDS 109 and 110) carries out the record nor the reproduction.

The displaying unit 119 may notify the user of a time for replacement of the HDD 110 based on the continuous conducting periods of and the ages on the two HDDS (the HDDS 109 and 110) even though the two HDDS (the HDDS 109 and 110) have not developed a breakdown. The operational status in the above case is displayed in FIG. 18E.

The above described controls; that is (i) dividing the recording area of a magnetic disk device into a video area and an audio area, (ii) arranging the area 201 for recording the video file and the area 202 for recording the audio data on the outer circumference and the inside of the magnetic disk, respectively; (iii) mirroring, in the recording, the video data and the audio data to the identical logical address employed by the two HDDS (the HDDS 109 and 110), namely, the magnetic disks with the video data and the audio data divided based on the video area and the audio area; and (iv) reading, in the reproducing, each of the video data and the audio data out of a different HDD (the HDD109 or the HDD 110). As well as protecting the recording area, the controls make possible improving reproduction performance and editing performance of the video data and the audio data by decreasing the number of seeks in the magnetic disk device and reducing the seek time, as well as protecting the recorded data.

Further, the two HDDS with the video data and the audio data mirrored (the HDDS 109 and 110) have the same data in the same LBA. Hence, switching between the HDDS in the above breakdown can be easily handled by reading the same LBA data out of one of the HDDS (one of the HDD 109 and the HDD 110) when the other one of the HDDS (the other one of HDDS 109 and 110) breaks down Moreover, the HDD control unit 108 alternatively reads each of the video data and the audio data out of either one of the two HDDS (the HDDS 109 and 110), and conceals which data to be read out of which HDD. Since this dispenses with determination by the reproducing control unit 104 whether the video data and the audio data is reproduced either out of the two HDDS or the single HDD, sharing the controls between the two-HDD reproduction and the single-HDD reproduction is possible.

It is noted that FIGS. 10, 11, and 15 show the reproduction control involving the reading of the video data and the audio data out of the HDD 109 and the HDD 110, respectively; meanwhile, the reproduction control may involve the reading of the video data and the audio data out of the HDD 110 and the HDD 109, respectively.

Further, FIGS. 10, 11, and 15 show that the reading starts with the video data; meanwhile, the reading may start with the audio data.

Second Embodiment

The first embodiment has described the case of the reproduction controls with one of the HDDS since the other one is assumed to suffer a breakdown. A second embodiment describes a reproduction control which involves reproduction with a single HDD even though both of the two HDDS are in normal operation. Here, the two-HDD reproduction corresponds to the first method in the present invention; that is, the video data is read out of one of the first disk device and the second disk device, and the audio data the other one of the first disk device and the second disk device. The reproduction with the single HDD corresponds to the second method in the present invention; that is, the video data and the audio data is read out of either the first disk device or the second disk device.

In the case where the system realizing the above is a portable device powered by a battery, for example, reduction of the power consumption is essential to extend the operating time.

Further, a required transfer rate varies depending on a video format to be reproduced.

Hence, described below is a control when a transfer rate (Rpb 2, Rpb 4, and Rpb 6) in reproducing video data and audio data with a single HDD (the HDDS 109 or 110) exceeds a reproduction rate of the video data and the audio data. In recording, the video recording and reproducing apparatus 100 uses two HDDS (the HDDS 109 and 110), employing a similar recording control method shown in the first embodiment, to perform mirroring for writing in the identical logical address employed by the two HDDS (the HDDS 109 and 110) in order to protect the data. In reproducing, the video recording and reproducing apparatus 100 performs a reproduction control for reproducing with the single HDD (the HDD 109 or the HDD 110). Further, in the reproduction, the video recording and reproducing apparatus 100 may either turn off an HDD not in use (one of the HDDS 109 and 110) or turn the HDD not in use (one of the HDDS 109 and 110) to a low-power-consumption mode. This makes possible reducing the power consumption for the entire apparatus.

In addition, Rpb 2, Rpb 4 or Rpb 6 are used to calculate the transfer rate for each combination of the video format and a kind of the edit. According to the calculated transfer rate, selected is the number of HDDS to be used in each of the operations, such as normal reproduction, reproduction in special mode, recording, and edit. This enables a more delicate power control.

It is noted that the video recording and reproducing apparatus 100 may include a selecting unit which selects the number of HDDS to be used. The selecting unit, corresponding to a selecting unit in the present invention, selects between a first method and a second method. Here, the first method is to read the video data out of one of the first and second disk devices, and the audio data out of the other one of the first and second disk devices. The second method is to read both of the video data and the audio data out of one of the first and second disk devices.

When an reproduction error occurs while the single HDD (one of the HDD 109 and the HDD 110) is in operation, the video recording and reproducing apparatus 100 activates the other HDD (the other one of the HDD 109 and the HDD 110) with the power turned off or in the low-power-consumption mode, and reads out the video data and the audio data. This enables the operation to continue.

It is noted that error treatment (access timeout) in recording in the second embodiment is similar to that in the first embodiment, and shall be omitted.

As described above, the first embodiment involves switching the HDDS reproducing the video data and the audio data to achieve life extension of the HDDS. Meanwhile, the second embodiment as well involves switching the HDDS for every: start-up; reproduction request from the external input unit 118; or start-up at a predetermined counter period, counting the number of the reproduction requests. This achieves life extension of the HDDS.

It is noted that the reproduction controls in reproducing and editing are similar to those in reproducing with the single HDD in the first embodiment; that is, the reproducing control unit 104 performs a control for alternatively reading the video data and the audio data.

Third Embodiment

A third embodiment describes a reproduction control, which is different from that in the first embodiment, in reproducing with a use of two HDDS.

FIG. 19 shows a control method for reading a video file and an audio file, in the third embodiment of the present invention, out of HDDS.

The reproducing control method in the third embodiment shall be described, using FIG. 19. The HDD control unit 108 includes two lines of buses; namely, a bus 600 for transferring video data and a bus 601 for transferring audio data. For example, the HDD control unit 108 reads the video data out of the HDD 109, and uses the bus 600 for transferring video data to transfer the video data to the buffer memory for reproduction 107. Moreover, the HDD control unit 108 reads the audio data out of the HDD 110, and uses the bus 601 for transferring audio data to transfer the audio data to the buffer memory for reproduction 107. Here, the video data and the audio data can be independently read out of the respective HDDS 109 and 110.

It is noted that the bus 600 for transferring video data corresponds to a video data reading unit in the present invention. The video data is read via the bus 600.

Moreover, the bus 601 for transferring audio data corresponds to an audio data reading unit in the present invention. The video data is read via the bus 601.

Monitoring the buffer memory for reproduction 107, the reproducing control unit 104 starts reproduction, with the video data and the audio data accumulated to a predetermined capacity. Since the video data and the audio data is alternatively transferred in the first embodiment, the following transfer should be put on hold until at least each one of recording units for the video data and the audio data is transferred. In the third embodiment, the video data and the audio data can be independently transferred. This can reduce a time between receiving a reproduction request from the external input unit 118 and starting the reproduction.

FIG. 20A illustrates a reproducing method for reading a video file and an audio file, which are successively arranged, with a use of two HDDS in the third embodiment of the present invention.

As shown in FIG. 9, pieces of data to be read are successively arranged. FIG. 20A shows that a normal reproduction can reduce a seek time and a search time since the normal reproduction involves reading the video file and the audio file, which are successively arranged pieces of data, with a use of two HDDS. The normal reproduction is the reproducing control method achieving the highest transfer rate.

FIG. 20B illustrates a reproducing method for reading a video file and an audio file, which are discretely arranged, with a use of the two HDDS in the third embodiment of the present invention.

In the case of the cut edit in FIG. 13; that is: the pieces of data to be read are discretely arranged; and the discretely-arranged video and audio files are read with a use of the two HDDS, the pieces of data to be read are discretely arranged as shown in FIG. 20B. This frequently causes the seek time and the search time. Since the video data and the audio data is read on a separate control, the transfer of the audio data ends before that of the video data ends since the audio file is smaller than the video file in file size. Hence, the seek time and the search time which occur in reading the audio data can be ignored.

Assuming transfer rates to be Rpb 7 and Rpb 8 respectively representing the cases where pieces of reproduction data to be read are: consecutively arranged; and discretely arranged, Rpb 7 and Rpb 8 are calculated out of the following expressions:

$$Rpb\ 7 = (Dv + Da)/Tv$$

$$Rpb\ 8 = (Dv + Da)/(Tv + Tsv + Tsh)$$

Dv=The recording unit of the video file (Byte)
Da=The recording unit of the audio file (Byte)
Tv=The read time of Dv (sec)
Tsv=The seek time between pieces of the video data (sec)
Tsh=The search time (sec)

Compared with the reproducing control method using the transfer rate Rpb 1 with two HDDS in the normal reproduction of the first embodiment, the reproducing control method of the third embodiment can achieve improvement in transfer rate since all times for reading the audio data can be ignored in both of the cases where the reproduction data to be consecutively arranged, and discretely arranged. Hence, the apparatus realized in the third embodiment can handle a video format having a reproduction rate higher than that of a video format which the apparatus in the first embodiment handles. This make possible realizing an apparatus having faster responsiveness.

In the reproduction in special mode and the cut edit of the third embodiment, as well, a time for reading the audio data can be ignored. This can further enhance the transfer rate in reproduction, which achieves improvement in responsiveness and error tolerance of the device.

It is noted that the access timeout treatment in recording and reproducing and the reproducing control method with a single HDD due to a breakdown of one of the two HDDS are similarly performed as so in the first embodiment, and shall be omitted.

As described above, the video recording and reproducing apparatus in the present invention employs: the recording control by mirroring which writes the video data and the audio data to the identical logical address employed by two disk devices (the HDDS 109 and 110); and the reproduction control that the video file and the audio file are separately reproduced out of the two different disk devices (the HDDS 109 and 110), so that the number of seeks and the seek time can be reduced in reading. This achieves improvement in reproduction performance and edit performance, which makes possible reproducing and editing a video file and an audio file having a higher reproduction rate.

Further, the video recording and reproducing apparatus in the present invention can be downsized since realized with as few as two disk devices. Moreover, in the case where the reproduction performance and the edit performance fully satisfies the reproduction rate of the video file and the audio file, the performance requested to the disk device can be slowed down. This allows a use of an inexpensive disk device. As a result, the video recording and reproducing apparatus can be built at a low cost.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention can be used for a video recording and reproducing apparatus and a method thereof; in particular, for an industrial video recording and reproducing apparatus used in a broadcast station involving recording, reproducing and editing of a video and an audio which require a large amount of video data and corresponding audio data thereto, such as for high-definition broadcast.

The invention claimed is:

1. A video recording and reproducing apparatus comprising:
   a first disk device and a second disk device;
   a mirroring unit configured to mirror video data and audio data to an identical logical address employed by said first disk device and said second disk device;
   a reading unit configured to read (i) the video data out of one of said first disk device and said second disk device, and (ii) the audio data out of another one of said first disk device and said second disk device; and
   a reproducing unit configured to reproduce, via synchronization, the video data and the audio data read by said reading unit,
   wherein each of said first disk device and said second disk device includes a storage area divided into a first area and a second area, and
   wherein said mirroring unit is configured to assign the first area and the second area in proportion to a reproduction rate representing a data transfer rate in reproducing the video data and the audio data, the first area and the second area being included in each of said first disk device and said second disk device.

2. The video recording and reproducing apparatus according to claim 1, further comprising
   a detecting unit configured to detect a breakdown of said first disk device and a breakdown of said second disk device,
   wherein, in the case where said detecting unit detects one of the breakdown of said first disk device and the breakdown of said second disk device, said reading unit is configured to read the video data and the audio data out of another one of said first disk device and said second disk device.

3. The video recording and reproducing apparatus according to claim 2,
   wherein, in the case where neither the breakdown of said first disk device nor the breakdown of said second disk device is detected, said reading unit is configured to read, under a first reproduction condition representing a constraint in reproduction, (i) the video data out of one of said first disk device and said second disk device, and (ii) the audio data out of another one of said first disk device and said second disk device, the first reproduction condition representing a constraint in reproduction, and
   in the case where one of the breakdown of said first disk device and the breakdown of said second disk device is detected by said detecting unit, said reading unit is configured to read, under a second reproduction condition representing a constraint in reproduction, the video data and the audio data out of the another one of said first disk device and said second disk device.

4. The video recording and reproducing apparatus according to claim 3,
   wherein each of the first reproduction condition and the second reproduction condition includes a video frame update cycle of the video data.

5. The video recording and reproducing apparatus according to claim 3,
   wherein each of the first reproduction condition and the second reproduction condition includes a continuously-reproducible data size in editing the video data or the audio data.

6. The video recording and reproducing apparatus according to claim 1, further comprising
a switching unit configured to switch between said first disk device and said second disk device for every power-on of said video recording and reproducing apparatus, switched one of said first disk device and said second disk device being designated as a disk device out of which said reading unit reads the video data,
wherein said reading unit is configured to read the video data out of the one of said first disk device and said second disk device to which said switching unit switches.

7. The video recording and reproducing apparatus according to claim 1, further comprising
a switching unit configured to switch between said first disk device and said second disk device for every predetermined number of reproduction times by said video recording and reproducing apparatus, switched one of said first disk device and said second disk device being designated as a disk device out of which said reading unit reads the video data,
wherein aid reading unit is configured to read the video data out of the one of said first disk device and said second disk device switched to which said switching unit switches.

8. The video recording and reproducing apparatus according to claim 1, further comprising:
a number of errors detecting unit configured to count the number of errors representing the number of failures of reading out of said first disk device and said second disk device; and
a selecting unit configured to select one of said first disk device and said second disk device which has a smaller number of errors,
wherein said reading unit is configured to read the video data out of one of said first disk device and said second disk device selected by said selecting unit.

9. The video recording and reproducing apparatus according to claim 1,
wherein said mirroring unit is configured to mirror a video file in the first area and an audio file in the second area, each of the video file and the audio file being separately formed out of the video data and the audio data to be mirrored.

10. The video recording and reproducing apparatus according to claim 9,
wherein said mirroring unit is configured to assign (i) the first area to an outer circumferential area of each of said first disk device and said second disk device, and (ii) the second area to an inner circumferential area of each of said first disk device and said second disk device.

11. The video recording and reproducing apparatus according to claim 10,
wherein said mirroring unit is configured to assign the first area and the second area in proportion to a reproduction rate representing a data transfer rate in reproducing the video data and the audio data, the first area and the second area being included in each of said first disk device and said second disk device.

12. The video recording and reproducing apparatus according to claim 1, further comprising
a selecting unit configured to select one of (i) a first method for reading the video data out of one of said first disk device and said second disk device and the audio data out of another one of said first disk device and second disk device, and (ii) a second method involving reading both of the video data and the audio data out of one of said first disk device and said second disk device,
wherein said reading unit is configured to read the video data and the audio data according to either the first method or the second method selected by said selecting unit.

13. The video recording and reproducing apparatus according to claim 12,
wherein said selecting unit is configured to select the second method in the case where a reproduction rate is lower than a predetermined value, the reproduction rate representing a data transfer rate in reproducing the video data and the audio data.

14. The video recording and reproducing apparatus according to claim 12,
wherein said selecting unit is configured to select the second method in the case where a video frame update cycle of the video data is shorter than a predetermined update cycle.

15. The video recording and reproducing apparatus according to claim 12,
wherein said selecting unit is configured to select the second method in the case where a continuously-reproducible data size in editing either the video data or the audio data is longer than a predetermined size.

16. A video recording and reproducing method for a video recording and reproducing apparatus with a use of a first disk device and a second disk device, each of the first disk device and the second disk device including a storage area divided into a first area and a second area, said video recording and reproducing method comprising:
mirroring video data and audio data to an identical logical address employed by the first disk device and the second disk device;
reading (i) the video data out of one of the first disk device and the second disk device, and (ii) the audio data out of another one of the first disk device and the second disk device; and
reproducing, via synchronization, the video data and the audio data read in said reading,
wherein said mirroring comprises assigning the first area and the second area in proportion to a reproduction rate representing a data transfer rate in reproducing the video data and the audio data, the first area and the second area being included in each of the first disk device and the second disk device.

17. A non-transitory computer-readable medium having a program stored thereon for recording and reproducing a video by a video recording and reproducing apparatus with a use of a first disk device and a second disk device, each of the first disk device and the second disk device including a storage area divided into a first area and a second area, the program causing a computer to execute:
mirroring video data and audio data to an identical logical address employed by the first disk device and the second disk device;
reading (i) the video data out of one of the first disk device and the second disk device, and (ii) the audio data out of another one of the first disk device and the second disk device; and
reproducing, via synchronization, the video data and the audio data read in said reading, wherein said mirroring comprises assigning the first area and the second area in proportion to a reproduction rate representing a data transfer rate in reproducing the video data and the audio data, the first area and the second area being included in each of the first disk device and the second disk device.

* * * * *